A. H. WOODWARD.
FARE RECORDER.
APPLICATION FILED SEPT. 10, 1910.

1,256,859.

Patented Feb. 19, 1918.
20 SHEETS—SHEET 1.

Witnesses:
Leonard W. Novander
George E. Higham

Inventor
Arthur H. Woodward
By Brown & Williams
Attorneys

A. H. WOODWARD.
FARE RECORDER.
APPLICATION FILED SEPT. 10, 1910.

1,256,859.

Patented Feb. 19, 1918.
20 SHEETS—SHEET 2.

Witnesses
Leonard W. Novander
George C. Higham

Inventor
Arthur H. Woodward
By Brown Williams
Attorneys

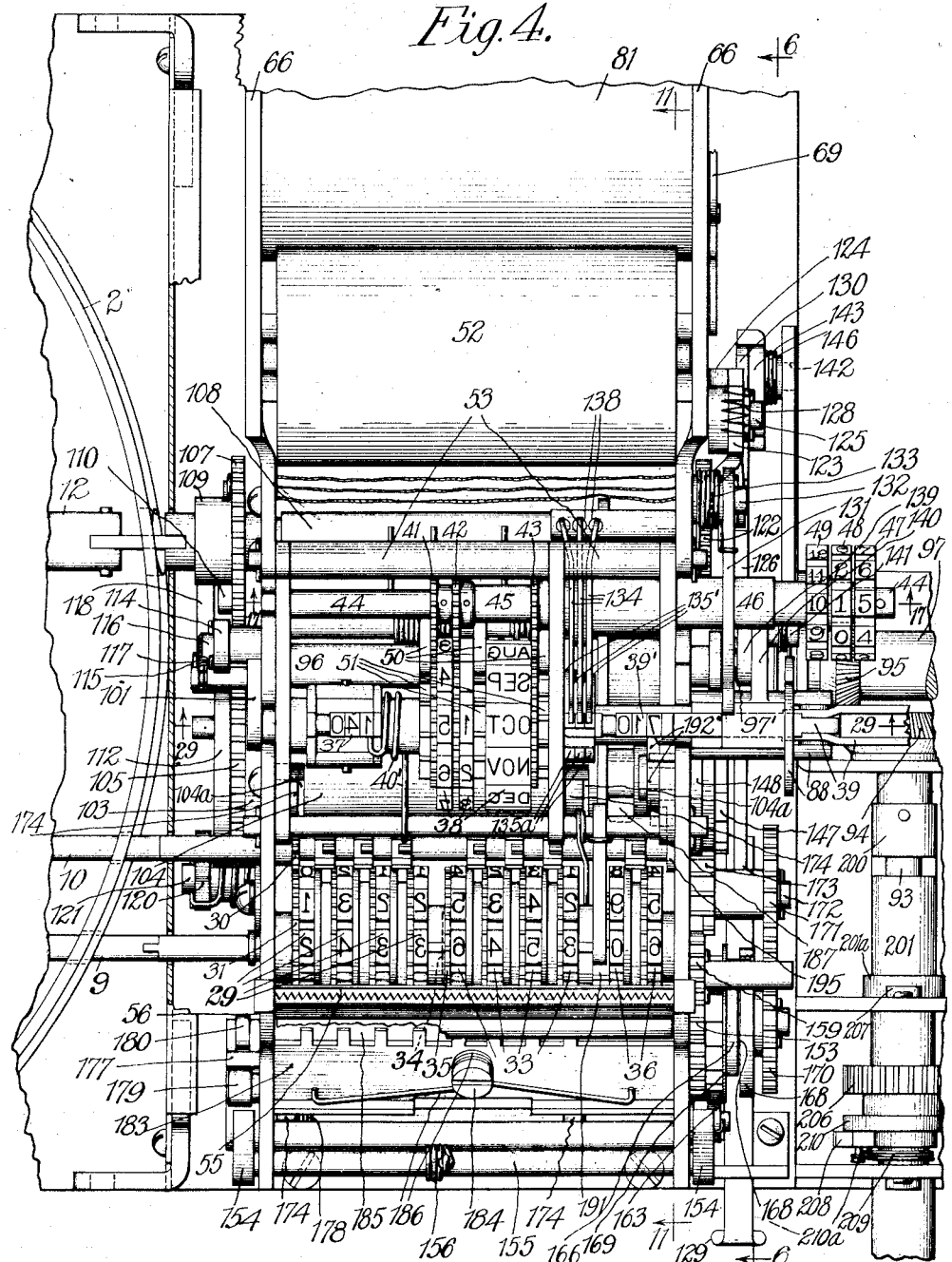

A. H. WOODWARD.
FARE RECORDER.
APPLICATION FILED SEPT. 10, 1910.

1,256,859.

Patented Feb. 19, 1918.
20 SHEETS—SHEET 4.

Witnesses:
Leonard W. Novander
George E. Higham

Inventor
Arthur H. Woodward
By Brown & Williams
Attorneys

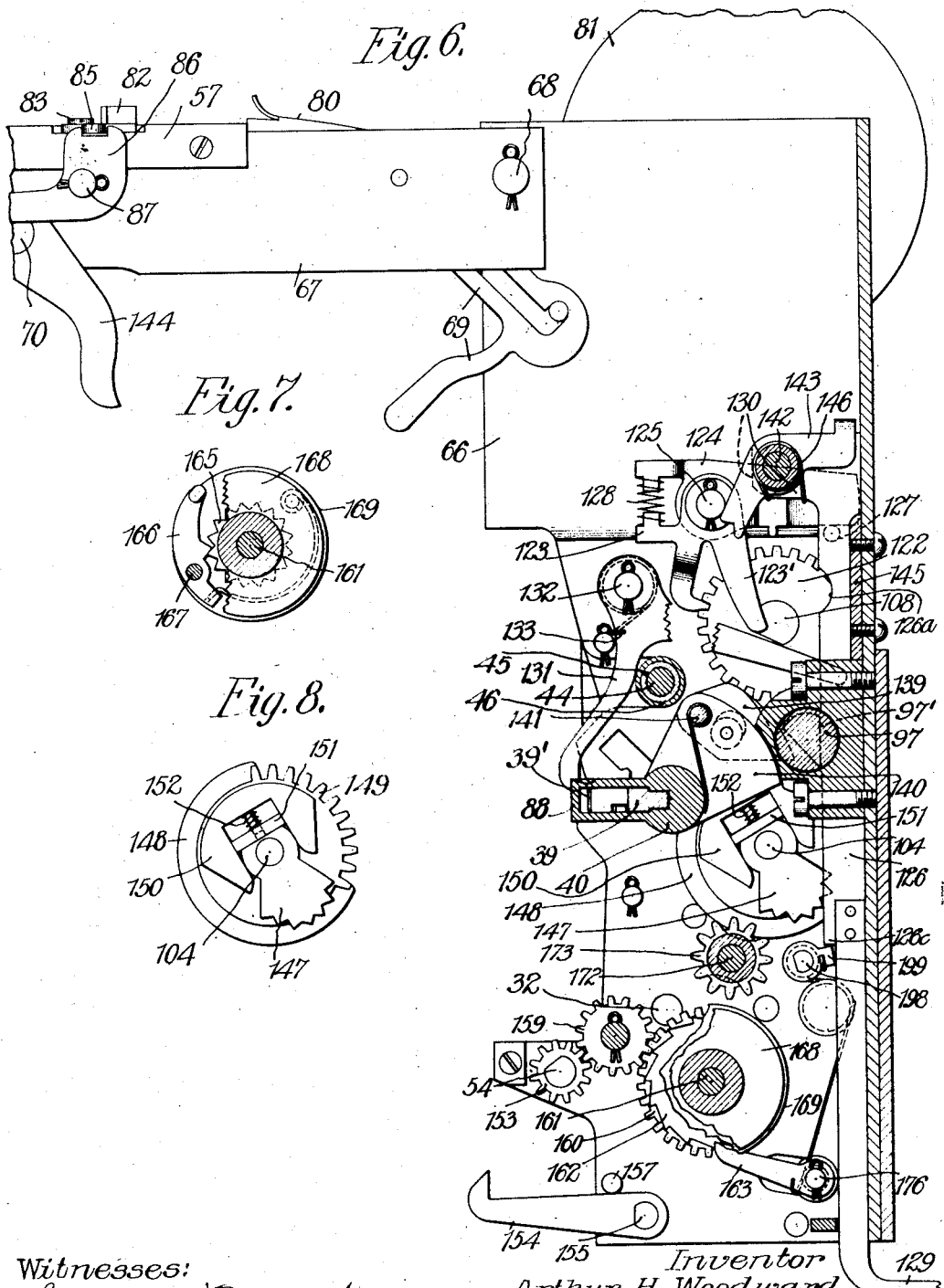

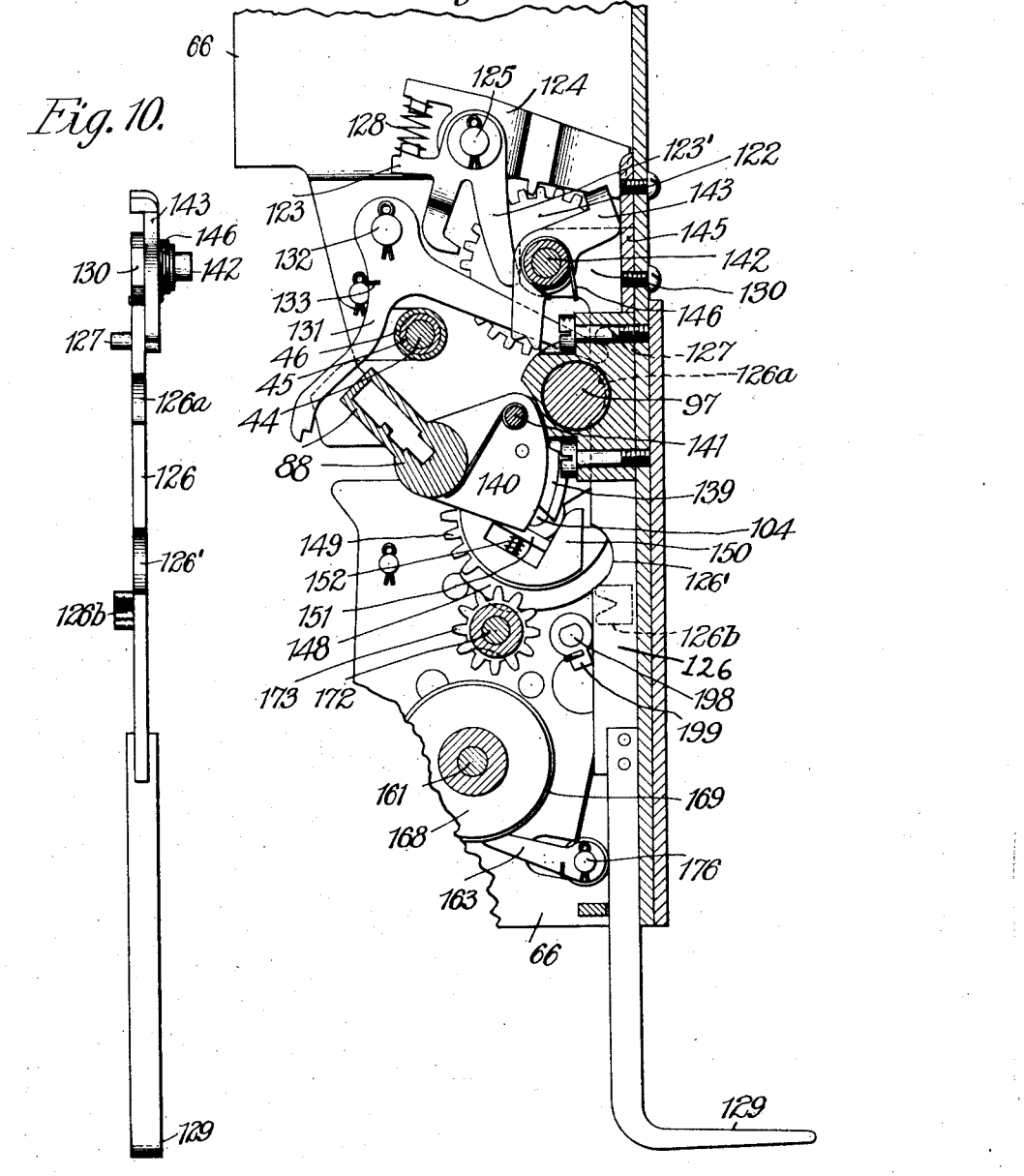

A. H. WOODWARD.
FARE RECORDER.
APPLICATION FILED SEPT. 10, 1910.

1,256,859.

Patented Feb. 19, 1918.
20 SHEETS—SHEET 7.

Witnesses:
Leonard W. Novander
George E. Higham

Inventor
Arthur H. Woodward
By Browne Williams
Attorneys

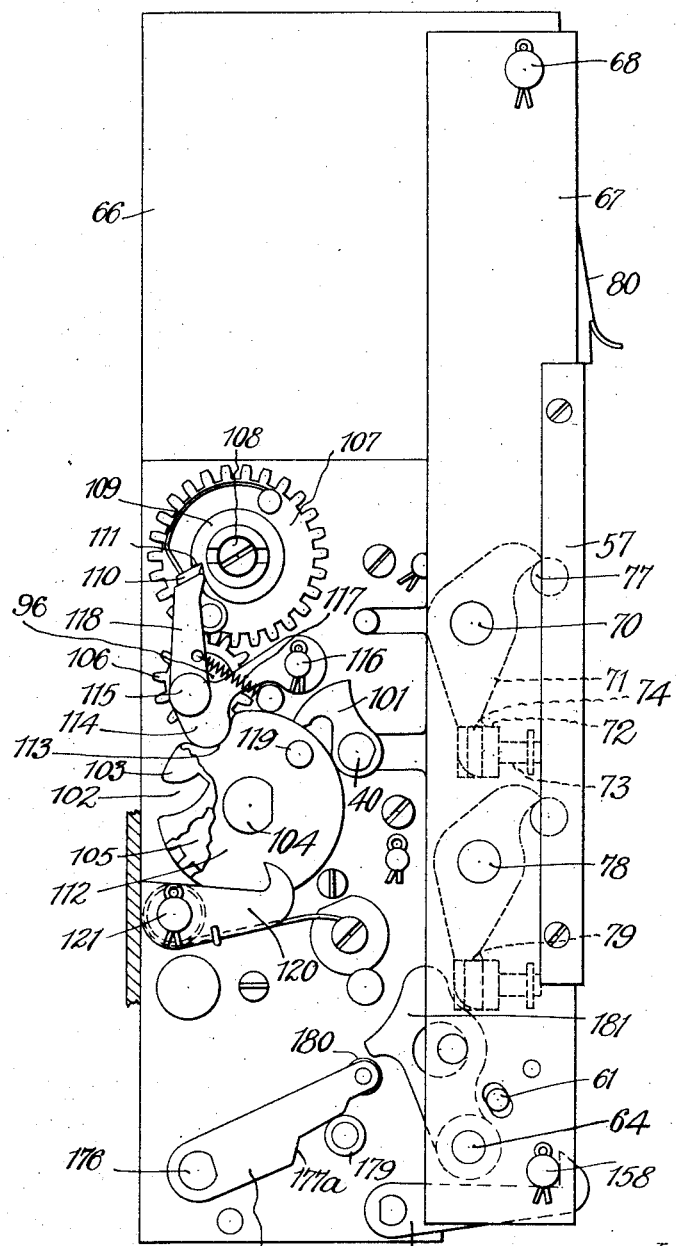

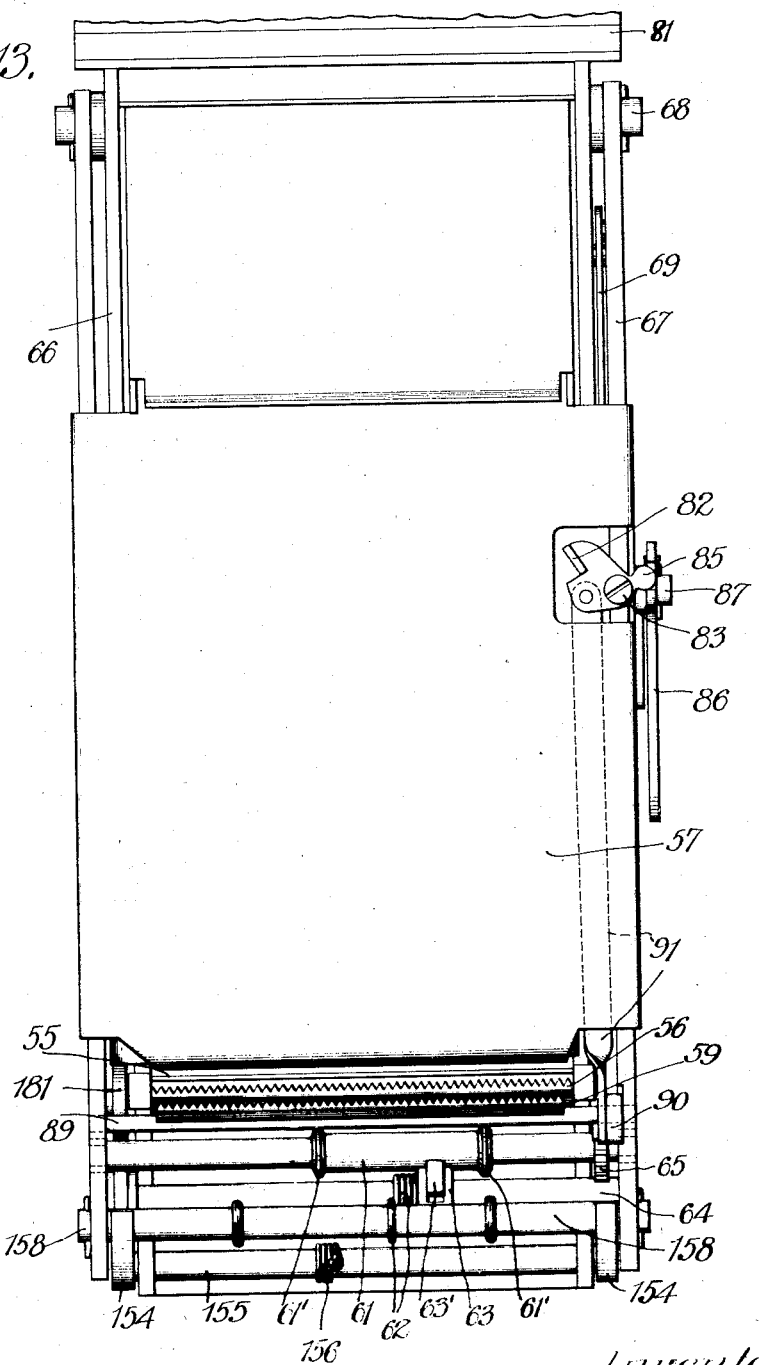

A. H. WOODWARD.
FARE RECORDER.
APPLICATION FILED SEPT. 10, 1910.

1,256,859.

Patented Feb. 19, 1918.
20 SHEETS—SHEET 10.

Witnesses:
Leonard W. Novander
George E. Higham

Inventor
Arthur H. Woodward
By Brown Williams
Attorneys

A. H. WOODWARD.
FARE RECORDER.
APPLICATION FILED SEPT. 10, 1910.

1,256,859.

Patented Feb. 19, 1918.
20 SHEETS—SHEET 11.

Witnesses:
Leonard W. Novander
George E. Higham

Inventor
Arthur H. Woodward
By Brown Williams
Attorneys

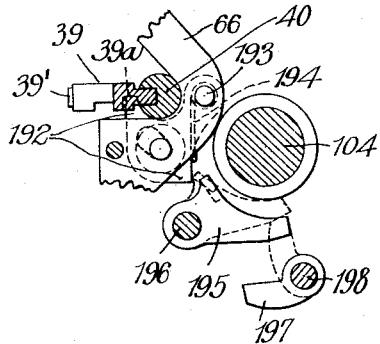
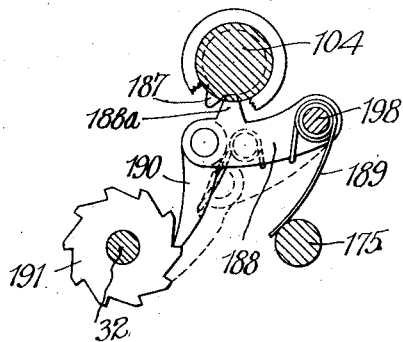

A. H. WOODWARD.
FARE RECORDER.
APPLICATION FILED SEPT. 10, 1910.

1,256,859.

Patented Feb. 19, 1918.
20 SHEETS—SHEET 13.

Witnesses:
Leonard W. Novander.
George E. Higham.

Inventor
Arthur H. Woodward
By Brown Williams
Attorneys

A. H. WOODWARD.
FARE RECORDER.
APPLICATION FILED SEPT. 10, 1910.

1,256,859.

Patented Feb. 19, 1918.
20 SHEETS—SHEET 14.

Witnesses:
Frank J. Thelen
Leonard W. Novander

Inventor
Arthur H. Woodward
By Browne Williams
Attorneys

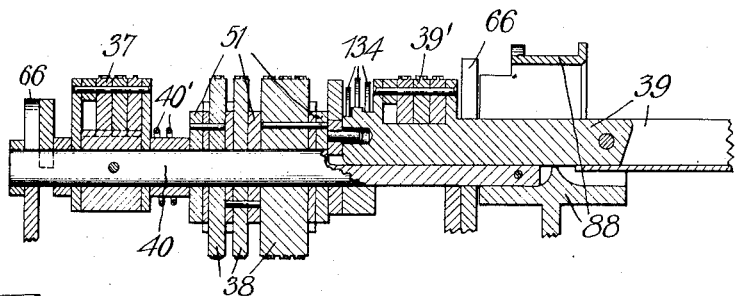
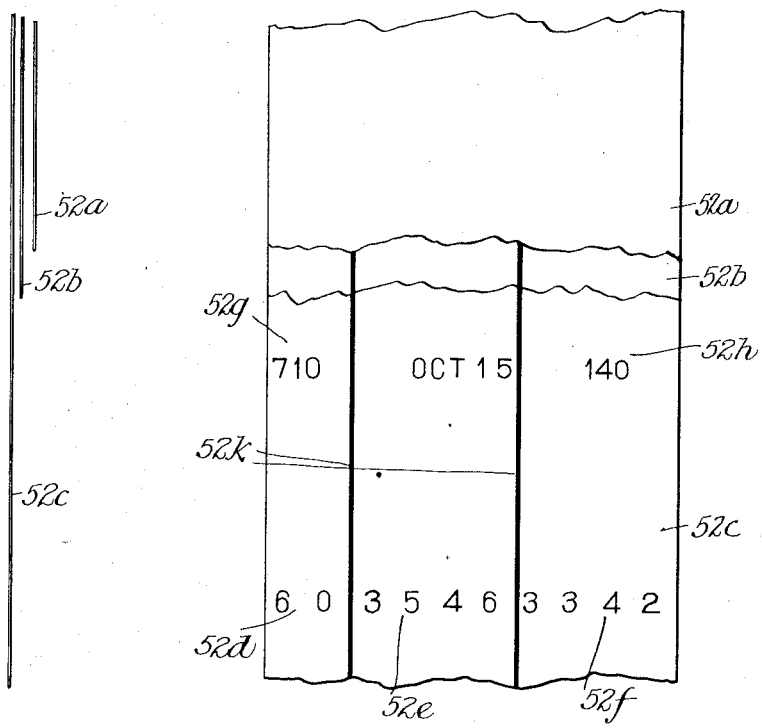

A. H. WOODWARD.
FARE RECORDER.
APPLICATION FILED SEPT. 10, 1910.

1,256,859.

Patented Feb. 19, 1918.
20 SHEETS—SHEET 16.

*Fig. 32.*

| | | |
|---|---|---|
| 211K—712 | OCT 15 | 140 |
| 211n — 6 4 | 3 5 5 8 | 3 5 6 0 |
| 211h — 6 4 | 3 5 5 8 | 3 5 6 0 |
| 211g — 6 3 | 3 5 5 5 | 3 5 5 8 |
| 211f — 6 2 | 3 5 5 4 | 3 3 5 6 |
| 211d—710 | OCT 15 | 140 |
| 211e — 6 2 | 3 5 5 4 | 3 3 5 6 |
| 211c — 6 2 | 3 5 5 2 | 3 3 5 0 |
| 211b — 6 1 | 3 5 5 0 | 3 3 4 2 |
| 211a — 6 0 | 3 5 4 6 | 3 3 4 2 |

Witnesses:
Leonard W. Novander
George C. Higham

Inventor
Arthur H. Woodward
By Brown Williams
Attorneys

A. H. WOODWARD.
FARE RECORDER.
APPLICATION FILED SEPT. 10, 1910.

1,256,859.

Patented Feb. 19, 1918.
20 SHEETS—SHEET 17.

Witnesses:
Leonard W. Novander
George E. Higham

Inventor
Arthur H. Woodward
By Brown Williams
Attorneys

A. H. WOODWARD.
FARE RECORDER.
APPLICATION FILED SEPT. 10, 1910.

1,256,859.

Patented Feb. 19, 1918.
20 SHEETS—SHEET 19.

Witnesses:
Leonard W. Novander
George S. Higham

Inventor
Arthur H. Woodward
By Brown Williams
Attorneys

A. H. WOODWARD.
FARE RECORDER.
APPLICATION FILED SEPT. 10, 1910
1,256,859.
Patented Feb. 19, 1918.
20 SHEETS—SHEET 20.
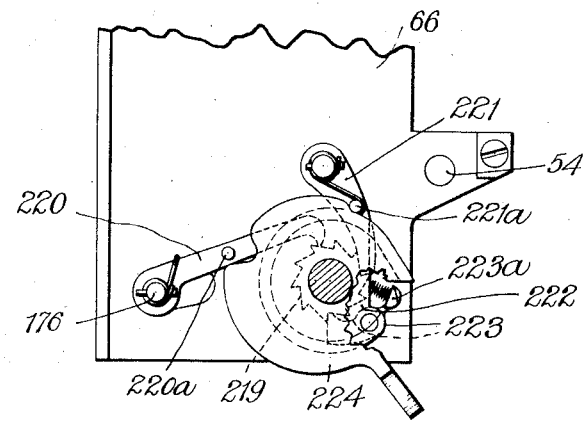
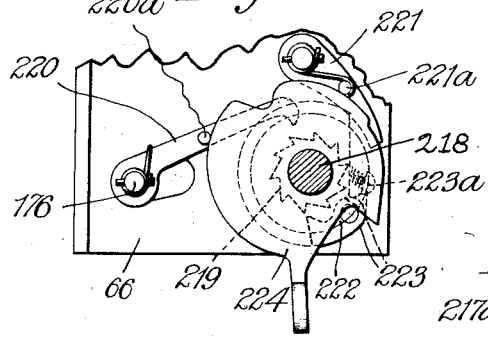
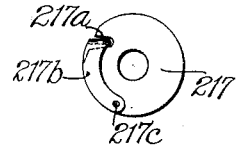
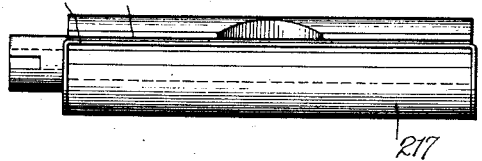
Witnesses:
Leonard W. Novander
George E. Higham
Inventor
Arthur H. Woodward
By Brown William
Attorneys

UNITED STATES PATENT OFFICE.

ARTHUR H. WOODWARD, OF ALTADENA, CALIFORNIA, ASSIGNOR TO THE INTERNATIONAL REGISTER CO., OF CHICAGO, ILLINOIS, A CORPORATION OF ILLINOIS.

FARE-RECORDER.

1,256,859.

Specification of Letters Patent.

Patented Feb. 19, 1918.

Application filed September 10, 1910. Serial No. 581,366.

*To all whom it may concern:*

Be it known that I, ARTHUR H. WOODWARD, a citizen of the United States, residing at Altadena, in the county of Los Angeles and State of California, have invented certain new and useful Improvements in Fare-Recorders, of which the following is a full, clear, concise, and exact description, reference being had to the accompanying drawings, forming a part of this specification.

My invention relates to recorders adapted to make a permanent record of the successive readings of a register and is particularly adapted for use in connection with devices of this class employed on cars used to carry passengers.

My recorder consists in the combination of printing mechanism adapted to be advanced to indicate any desired registration as, for example, the number of passengers carried by a car during any particular interval and in combination with such printing mechanism, means by which the attendant or conductor may make a permanent record from the printing mechanism.

In the preferred embodiment of my invention a plurality of strips of paper is employed and two or more duplicate records are simultaneously made, one for the attendant or conductor to be removed from the recorder when he leaves the car and another inaccessible to the attendant or conductor to be removed from the recorder only by an inspector having a suitable key to open the recorder for this purpose. The paper employed is preferably coated with finely divided carbon on one face and may be mounted in the recorder upon a common reel or upon separate reels, as desired. The records, after having been made may pass together into a suitable receptacle, or the attendant's record only may be taken to such receptacle and the other record or records may be led to independent mechanism adapted to receive the same.

My recorder is usually employed in connection with registering mechanism capable of being reset as desired and the resetting means is so connected to the printing mechanism as to make a record at each resetting operation. The resetting handle is also adapted when moved initially from its locking to its releasing position to print a record showing the condition of the registering mechanism.

While I shall refer to the mechanism used in making the record as printing mechanism, it is to be understood that I mean to include by such term any mechanism that may be used to print, emboss, stamp or otherwise communicate to the record strip or strips the condition of the recorder and register.

Since my recorder is particularly adapted for use in connection with passenger cars and is in such connection employed in conjunction with a fare register, it is shown in the accompanying specification and drawings as adapted for this use, although it is to be understood that it may be employed for any similar purpose desired.

In using my invention upon passenger cars, a conductor is provided with an identification key and a connecting plug for both of which he is held responsible to the railway company and the plug is marked to correspond with the characters of the identification key.

In connection with the resetting handle and interlocked with the same is provided a printing bar which, when actuated serves to print the conductor's identification and date and the recorder number, while operation of the resetting handle in either direction serves to print the condition of the register and the trip number; suitable interlocks are provided so that the register cannot be operated unless the connecting plug is in place to complete the resetting train of mechanism and the interlocking mechanism referred to requires such a sequence of operation that records must be made upon the strips in the recorder at the ends of the trips and that furthermore the conductor's identification must be printed upon the record before he can have access to his record and release from the recorder his identification key and connecting plug. If the conductor has omitted to insert his identification key, his connecting plug can only be released by an inspector having the required key to open the recorder.

These and other features of my invention will appear more fully in detail in connection with the description given below of the drawings in which Figure 1 is a face view of the recorder and register complete.

Fig. 4 is a plan view of the internal mechanism of the recorder.

Fig. 6 is a view of the parts shown in Fig. 4 taken along the line 6—6.

Fig. 7 is a detail view of ratchet mechanism employed in connection with the paper feed.

Fig. 8 is a detail view of a double pawl used to lock the printing bar.

Fig. 9 is a view of a portion of the parts shown in Fig. 6 in the position assumed by them when the printing bar is moved to its lower position.

Fig. 10 is a plan view of the printing bar and parts carried thereby.

Fig. 12 is a view of the left hand side of the recorder showing the mechanism mounted thereon.

Fig. 13 is a plan view of the recorder mechanism with the inner cover in place.

Fig. 20 is a detail view of means used for locking a latch to prevent removal of the identification key from its escutcheon when in the printing position.

Fig. 21 is a detail view of the mechanism employed to advance the trip number one unit for each resetting of the register mechanism.

Fig. 29 is a view of the parts shown in Fig. 4 taken along the line 29—29.

Fig. 30 is a face view of the record made by the printing mechanism.

Fig. 31 is an edge view of the record strips shown in Fig. 30.

Fig. 32 shows in face view a modified record made by the printing mechanism illustrating the relief of one conductor by another.

Fig. 36 is a detail view of mechanism located upon the left-hand side of the recorder, as shown in Fig. 33, which is provided to control the operative condition of the operating and holding pawls used in connection with the roller for receiving the auditor's record.

Fig. 37 is a detail view of the parts shown in Fig. 36 with the pawl-releasing member moved to a position to free the record roller so that the record may be removed from the same.

Figs. 38 and 39 are detail side and end views respectively of the record roller shown in Figs. 33 to 37, inclusive.

Figure 1:
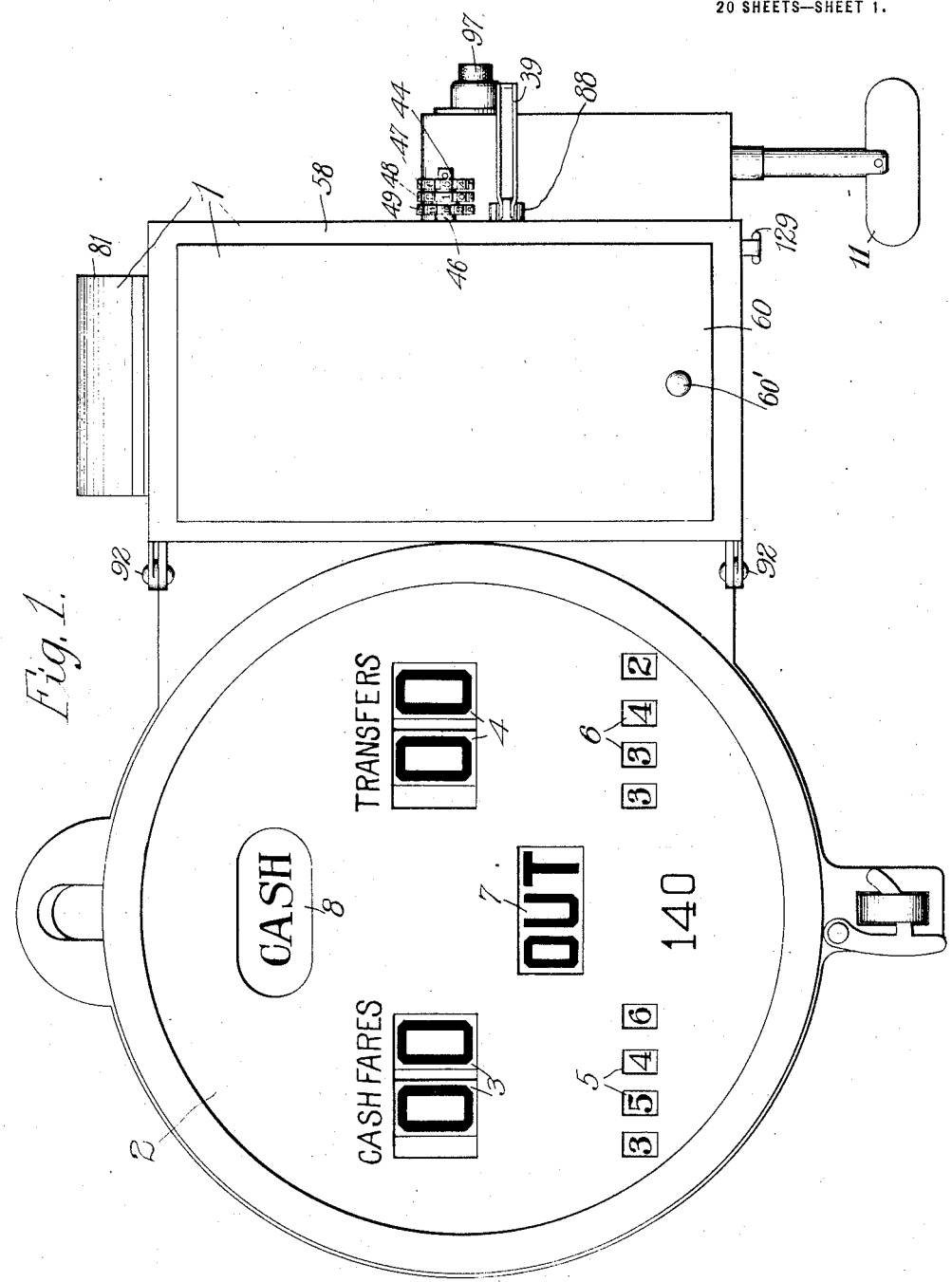

As shown in Fig. 1, the recording mechanism 1 is associated with a fare register 2 which register is provided with trip registers 3 and 4 for cash fares and transfers respectively. The register is also provided with totalizers 5 and 6 which indicate the total cash fares and transfers respectively that have been registered by the register 2.

A direction indicator 7 and the indicator 8 for showing the nature of the last registration are also provided.

Figure 3:
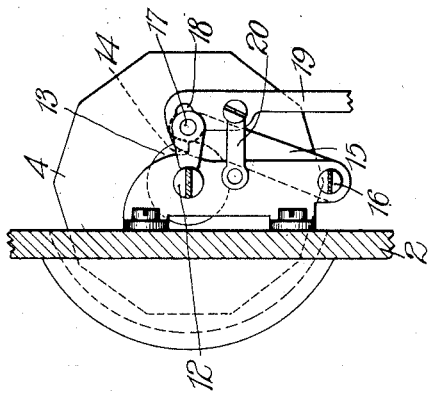
Fig. 3 is a view taken along the line 3—3 in Fig. 2.
Figure 2:
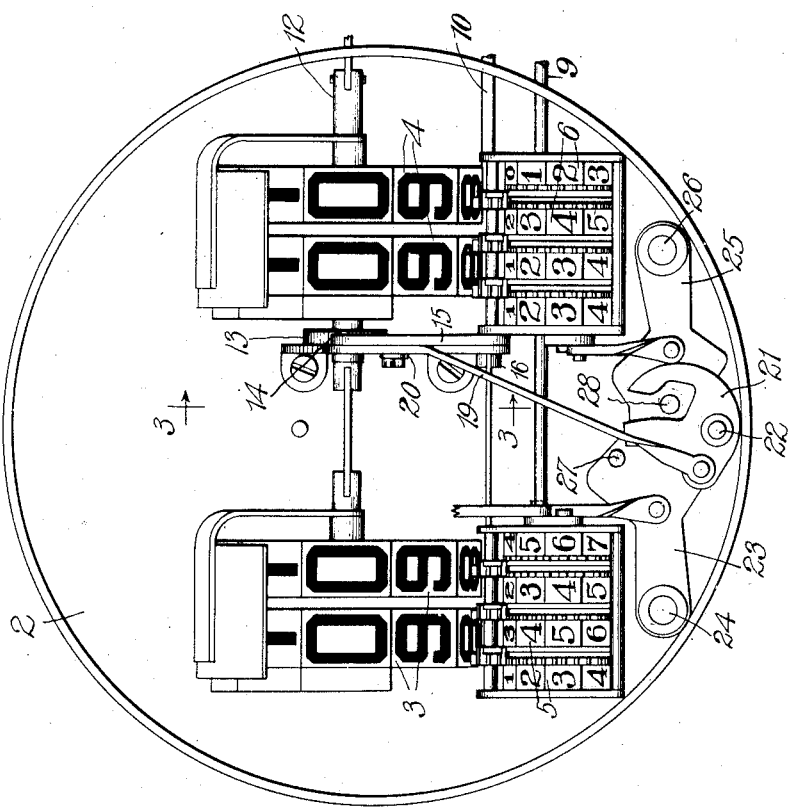
Fig. 2 is a view of the register mechanism with the cover plate removed and shows the mechanism employed to lock the register against actuation when the recorder printing mechanism is being operated.

The register 2 is connected with the recording mechanism by means of the shafts 9 and 10, indicated in Fig. 2, which serve to advance the printing mechanism in the recorder as the totalizers 5 and 6 respectively are advanced. A resetting handle 11 is provided in connection with the recording mechanism and adapted to communicate with the trip registers 3 and 4 by means of a shaft 12 which when operated by the resetting handle 11 rotates the trip register wheels to restore them to their zero position. The fare register here shown does not form a part of this invention since it is the subject matter of United States Patents Nos. 818,508 and 818,509, issued to myself April 24, 1906. For the purpose of properly understanding the operation of the recorder mechanism it is sufficient to here note that a displacement of the shaft 12 from its normal position during the resetting and printing operations or during the printing operation alone serves to lock the register against actuation. This is accomplished by means of the mechanism shown in Figs. 2 and 3 as follows: The shaft 12 has rigidly secured thereto a collar 13 in which is formed a notch 14. A lever 15 pivoted at 16 to the framework of the register is provided at its upper end with a tooth adapted to engage the notch 14 and such lever carriers at the same end a pin 17 working in a slot 18 formed in the upper end of a link 19. The upper end of the link 19 is held in proper position relatively to the pin 17 by means of a link 20 which connects the link 19 with the frame of the register. The link 19 is pivotally connected at its lower end with a locking member 21 pivotally supported upon the register casing at 22. The cash fare trip indicator and totalizer is actuated by a lever 23 pivoted to the register casing at 24 while the transfer trip indicator and totalizer is operated by a similar lever 25 pivoted to the register casing at 26. The levers 23 and 25 are provided with locking pins 27 and 28 respectively which are adapted to be engaged by the locking member 21 when moved to its locking position in such a manner as to prevent downard motion of the lever 23 and upward motion of the lever 25 which directions of motion are necessary to cause the operation of the mechanism described. When the shaft 12 is returned to its normal position, which serves to bring the zero indications of the several indicators into view, the lever 15 and link 19 assume their normal positions under the action of a returning spring not shown and thus the locking member 21 is moved to the position indicated in Fig. 2 to release the locking pins 27 and 28.

Figure 11:
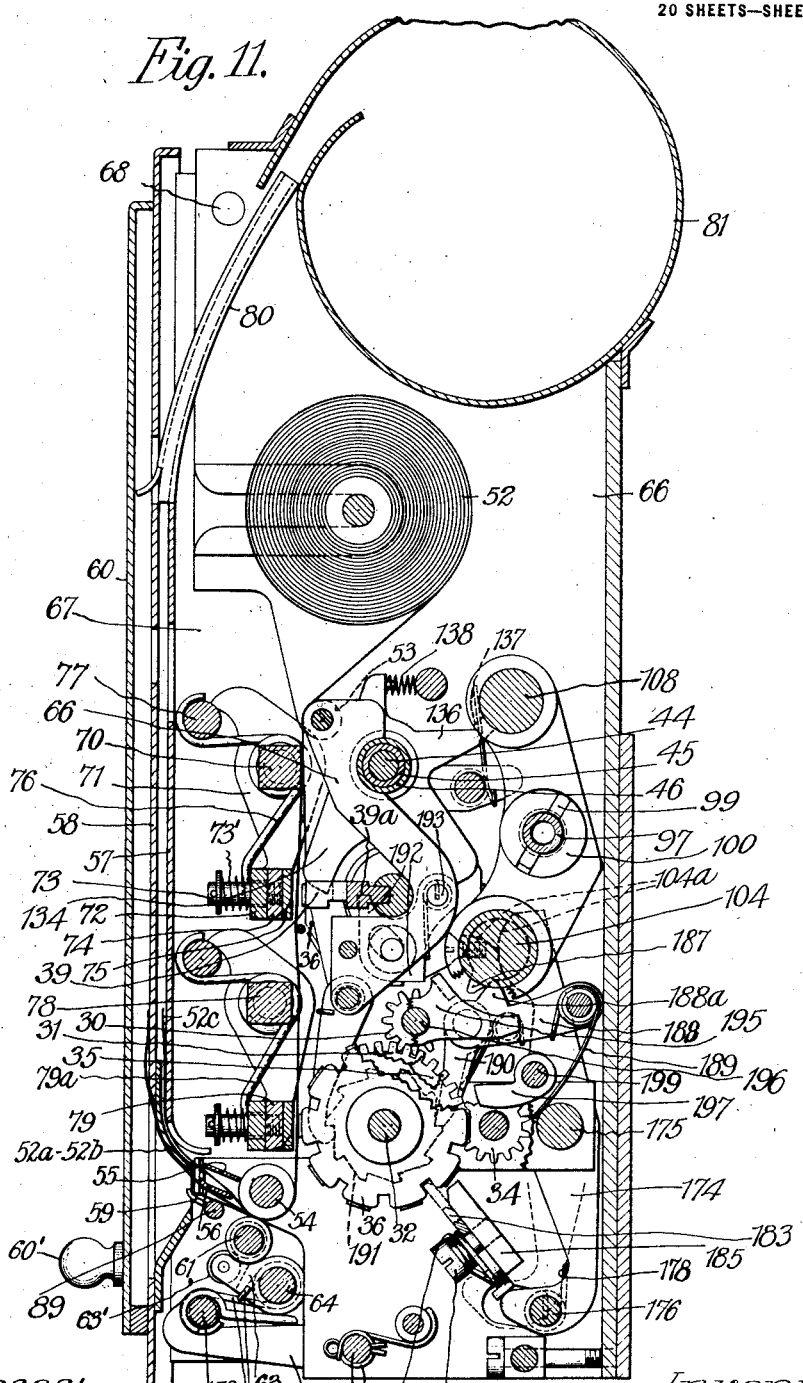
Fig. 11 is a view of the parts shown in Fig. 4 taken along the line 11—11.

In the recorder there are mounted printing wheels 29 adapted to be actuated by the operation of the shaft 10 from the transfer totalizer 6. The shaft 10 has secured to it just inside of the left hand wall of the recorder casing a pinion 30 meshing with a gear 31 secured to the units wheel 29 by which operation of the wheels 29 is effected. Suitable carry-over mechanism is provided between the wheels 29 so that a complete rotation of a wheel of one order advances the wheel of next higher order one unit. As shown in Fig. 11, the wheels 29 are loosely supported upon the shaft 32 from the framework of the recorder and upon this shaft there is similarly mounted a plurality of wheels 33 adapted to be actuated by the shaft 9 from the cash fare totalizer by means of a pinion 34 shown in Fig. 11 which engages a gear 35 rigidly secured to the units wheel 33. There are also mounted upon the shaft 32 two printing wheels 36 adapted to print the number of the trip upon the record and these wheels are advanced at the end of each trip in a manner to be described.

Above the type wheels 29, 33 and 36, a second set of printing mechanism is disposed consisting of a recorder number 37, date wheels 38 and a conductor's identification mark 39', the latter being carried by a removable key 39. The recorder number 37 and the identification mark 39' are carried by a rock shaft 40 by means of which the recorder number and the identification mark may be removed from their printing position or brought into printing position as the case may be in a manner to be described. The date wheels 38 are loosely mounted upon the rock shaft 40 and are adapted to be individually set by means of the pinions 41, 42 and 43 meshing with gears carried by the wheels 38, such pinions being connected respectively to the shaft 44 and the left hand ends of the sleeves 45 and 46. The shaft 44 has secured to its right hand end a setting and indicating disk 47, similar setting disks 48 and 49 being secured to the right hand ends of the sleeves 45 and 46 respectively. As a result of the construction described, the date wheels 38 may be individually set to bring any desired month and day into the printing line, the setting of the date wheels at any time being indicated by the readings on the edges of the disks 47, 48 and 49 that are centrally disposed on the front edges of such disks. Spring pawls 50 are provided to engage ratchet wheels 51 carried by the date wheels 38 to retain the date wheels in any position to which they are moved.

The record strips used in connection with the printing mechanism just referred to are led from a supply roll 52, shown in Fig. 11, over the guide rollers 53 and down in front of the printing devices above described around a feed roller 54. As shown in Figs.

4, 30 and 31, three separate strips of paper are employed of which the two nearest to the printing devices are coated on their faces away from the printing devices with finely divided carbon, while the third strip is plain. The record strips after being led together from the supply roll 52 around the feed roll 54 are separated, as indicated in Fig. 11, the plain strip being led between the guides 55 and 56 into a space between the plate 57 and the inner cover 48 of the recorder, while the two coated record strips are led between the guides 56 and 59 and up into the space between the inner cover 58 and the outer cover 60 of the recorder. As the strips pass around the feed roll 54 they are engaged by a coöperating feed roll 61, shown more clearly in Fig. 13, which feed roll has formed thereon two flanges 61' which are the only portions of the feed roll engaging the record strips. These flanges thus serve to not only feed the strips from the recorder into the receiving spaces above referred to but also to mark upon such strips vertical lines separating the different portions of the record in a manner to be described. The feed roll 61 is held in engagement with the feed roll 54 by means of a lever 63 which carries at its outer end a roller 63' bearing upon the feed roll 61. The lever 63 is pivotally supported upon the rod 64 and is caused to engage the feed roll 61 nearer the right-hand one of the flanges 61' than the left-hand one of such flanges, and this is done to compensate for the thrust exerted upon the pinion 65 secured to the feed roll 61 to drive it when such feed roll is actuated. As a result during the driving operation uniform pressure is exerted upon the two flanges 61' and the record strips are therefore fed through the recorder without tendency to displace them from their proper course.

The frame of the recorder mechanism is constructed in two parts 66 and 67 pivoted together at 68, as shown in Figs. 6 and 12, in order that the plates 57 and 58 and the sliding cover 60 may be moved from in front of the recorder mechanism to the position indicated in Fig. 6, in which position the portion 67 is held by a spring catch 69, as desired, to facilitate threading the strips of paper from the supply roll 52 through the recorder and into the proper position relatively to the plates 57 and 58. The portion 67 of the recorder frame has extending transversely thereof a shaft 70 to which are secured two arms 71, between the lower ends of which there is connected a bar 72, as shown in Fig. 11. The bar 72 has extending therethrough two studs 73, to the inner ends of which a platen 74 is secured. The platen 74 is provided with a facing 75 of resilient material, as rubber, of a proper degree of hardness to properly force the record strips against the characters constituting the register number 37, the date indication 38 and the conductor's identification mechanism 39 when the platen 74 is actuated. The facing 75 is normally not in engagement with the record strips, and is brought into engagement with the strips and thus into engagement with the characters referred to as a result of the inertia of the platen 74 acting against the spring 73' surrounding the studs 73 when the platen is forcibly brought into its normal position by the action of the spring 76 after the platen has been raised and released in a manner to be described. The lever arms 71 are extended upward above the shaft 70 to engage the rod 77 so that the spring 76 serves to normally hold the platen 74 and its facing 75 adjacent to the corresponding printing characters, but just out of engagement with the record strips.

The portion 67 of the frame-work of the recorder has extending transversely thereof a shaft 78 similar to the shaft 70 which serves to support a second platen 79 similar to the platen 74 adjacent to the printing characters carried by the wheels 29, 33 and 36, such platen 79 being normally held out of engagement with the record strips and brought into engagement therewith and therefore into engagement with the adjacent printing characters in the manner described for the platen 74.

The portion 67 of the recorder frame carries at its upper end a receiving tube 80 adapted to receive the record strips as they pass upward between the plates 57, 58 and the slide 60, and direct such record strips into the receptacle 81, in which they are rolled up by being continuously fed into the same until it is desired to remove the records from the recorder. It is to be noticed that the natural set of the record strips, due to their being rolled upon the supply roller 52, is in a direction to facilitate their rolling up in the receptacle 81, which is of practically a cylindrical conformation.

Figure 5:
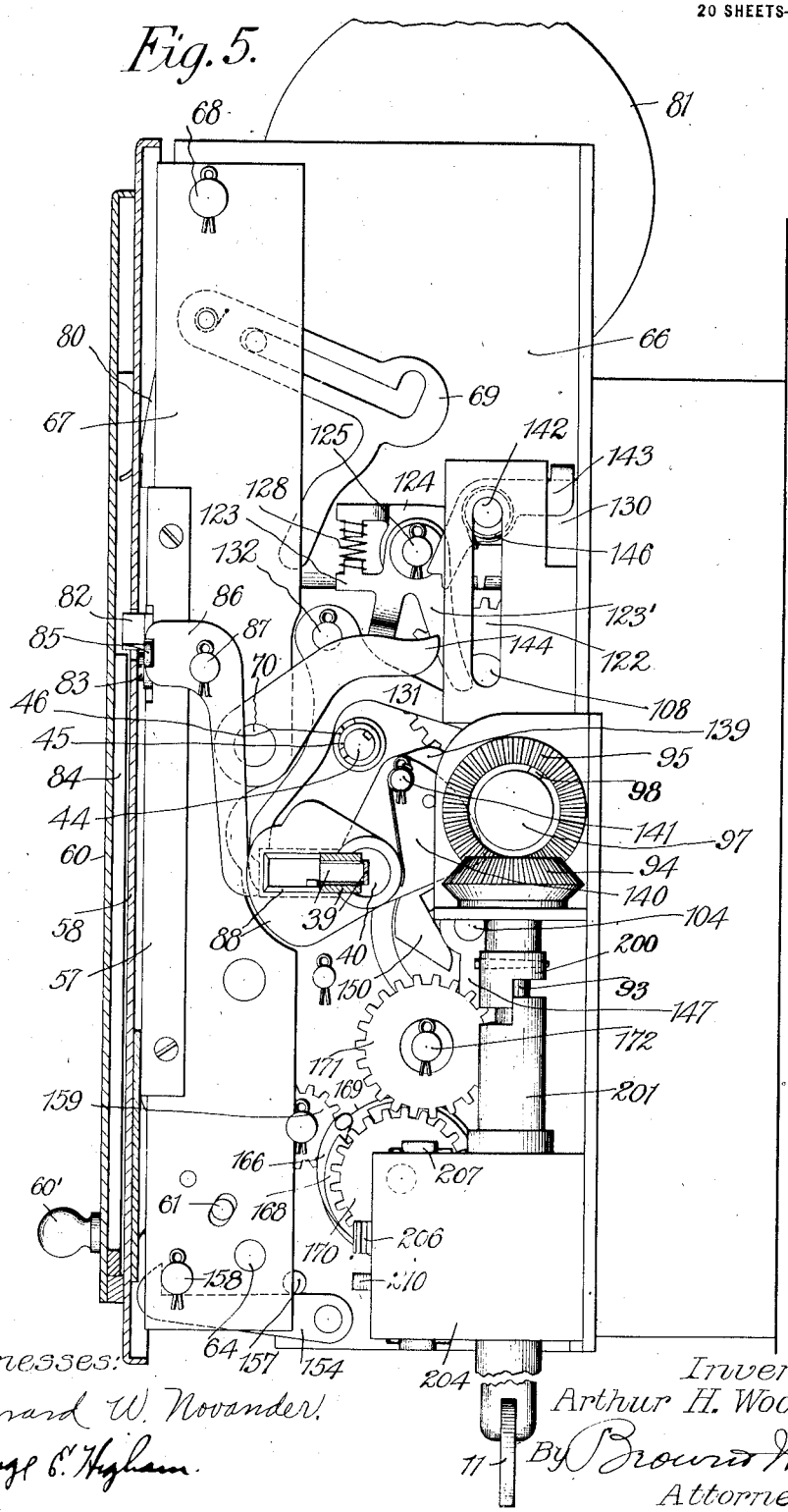
Fig. 5 is a view from the right of the parts shown in Fig. 4, the receiving passageway for the conductor's record being shown in section.
Figure 14:
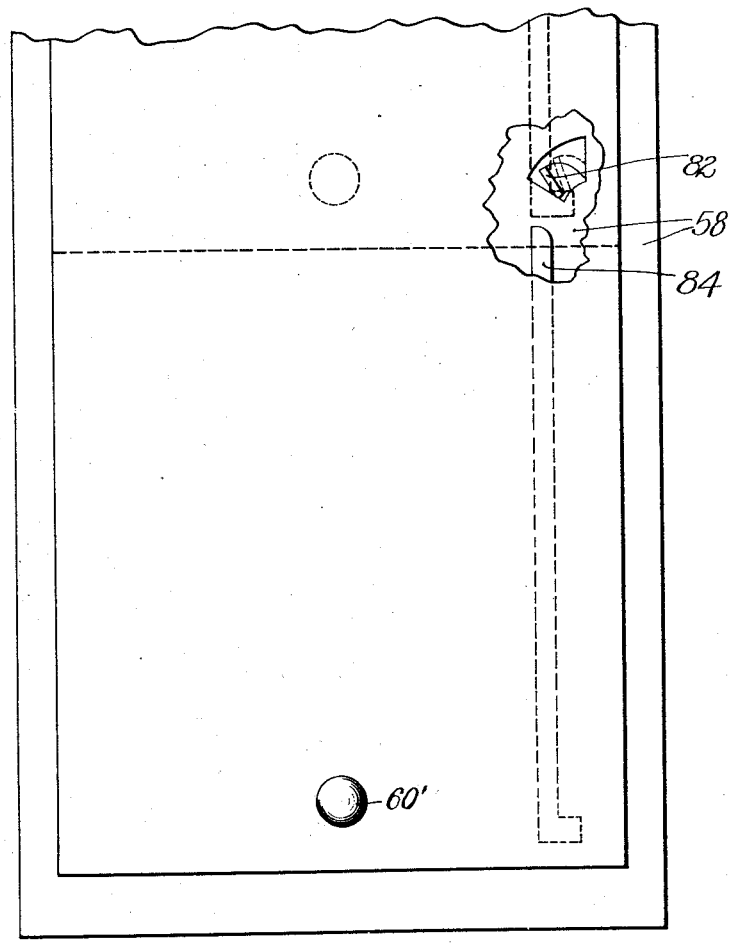
Fig. 14 is a plan view of the recorder showing the conductor's slide and the lock for controlling its operation.
Figure 17:
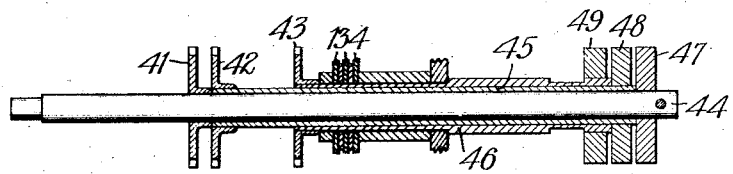
Fig. 17 is a sectional view taken along the line 17—17 in Fig. 4.

As shown in Figs. 5, 13 and 14, a locking member 82 is pivoted to the frame-work 67 at 83 to normally lie in the path of a flange 84 carried by the sliding cover 60 to prevent operation of such cover to remove the records.

The locking member 82 projects through the plates 57 and 58, as indicated in the drawings, to engage the flange 84, as described. The member 82 has formed thereon, as indicated in Fig. 13, a lug 85 engaging the shorter end of a bell-crank-lever 86 pivoted to the frame 67 at 87, the longer end of such lever being disposed over the key escutcheon 88 carried by the right-hand end of the shaft 40, when the key escutcheon is moved to its printing position, and for this position of the escutcheon the lever 86 is moved to bring the locking member 82 into the path of the flange 84. When the rock-shaft 40 is moved away from its printing position, as will be described, the lever 86 is free and the locking member 82 may be moved out of the path of the flange 84 by upward motion of the sliding cover 60. A handle 60' is provided to facilitate this operation.

The guides 56 and 59 for the record strips are serrated, as indicated in Fig. 13, and the guide 59 is mounted upon a shaft 89, to the right-hand end of which a crank 90 is secured, which crank is connected by the link 91 with the locking member 82, the connecting parts just described being so proportioned that when the locking member 82 is moved out of the path of the flange 84 by motion upward of the sliding cover 60 the guide 59 is brought forcibly into engagement with the back of the guide 56, and thus the two record strips between the plate 58 and the sliding cover 60 are clamped in a position to facilitate their being torn from the main portions of such strips by means of the serrated guide 59. It is further to be noted that with the sliding cover 60 in its upper position and the lever 86 rotated upon its pivot 87 by the action of the locking member 82, the escutcheon 88 cannot be moved from its inoperative position to its printing position. The engagement by the guide 59 of the two outer strips during a record-removing operation further serves to prevent the removal of an excess of the record strips from the recorder, by which the machine might be temporarily disabled by the conductor.

As shown in Fig. 1, the frame 58 upon which the sliding door 60 is mounted, is hinged to the portion 67 of the frame at 92, and the frame-work 58 also has secured to it the plate 58 and is normally held in the position indicated by means of a suitable lock, not shown, which is under the control of the inspector or auditor, so that by raising the frame-work 58 the auditor's record may be removed from the recorder.

Figure 15:
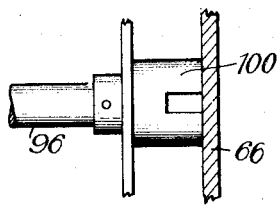
Fig. 15 is a detail view of the portion of the resetting train of mechanism adapted to receive the connecting plug.
Figure 16:
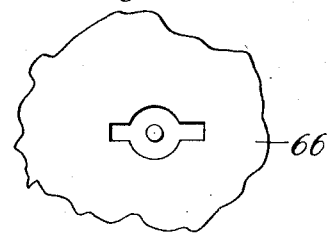
Fig. 16 is a view taken from the right of the portion of the recorder casing shown in Fig. 15.
Figure 27:
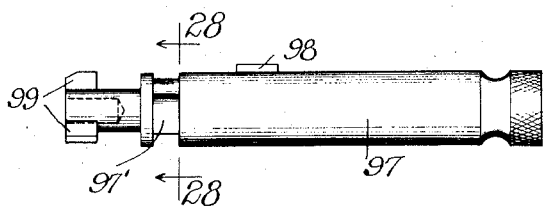
Fig. 27 is a detail view of the connecting plug.

The re-setting handle 11 is connected to the lower end of the shaft 93, and to the upper end of this shaft a bevel-gear 94 is secured, meshing with a similar bevel-gear 95 supported by the frame-work 66 of the recorder. The gear 95 is disposed in alinement with the shaft 96, but is normally disconnected therefrom and free to rotate without actuating any of the recording mechanism. A connecting plug 97 which is carried by the conductor and has marked upon it his characteristic indication corresponding with the indication carried by his identification key 39, is adapted to engage the gear 95 by means of a key 98 formed on such plug, as shown in Fig. 27, and in this position the keys 99 formed on the left-hand end of the connecting plug engage a slotted member 100 rigidly secured to the right-hand end of the shaft 96 as indicated in Fig. 15.

When the recorder is not in use the shaft 40 occupies its inoperative position and the connecting plug 97 is not in place in the gear 95, and for this position of the shaft 40, whether the connecting plug 97 is in place or not, rotation of the shaft 96 is impossible, and therefore the re-setting handle 11 cannot be rotated to the right when the plug 97 is in operative position. This locked condition results from the following construction: The shaft 40 has secured to its left-hand end, as shown in Figs. 4 and 12, a hook 101 adapted to engage a notch 102 formed in the periphery of a disk 103 carried by the left-hand end of the shaft 104, which shaft has also secured to its left-hand end a gear 105 meshing with a pinion 106 carried by the left-hand end of the shaft 96. The pinion 106 also meshes with a gear 107 secured to the left-hand end of a shaft 108 which is in axial alinement with a sleeve 109 secured to the right-hand end of the re-setting shaft 12. As shown in Fig. 4, the sleeve 109 and the gear 107 are disconnected from each other, but such gear is adapted to drive the sleeve when rotated in a clock-wise direction by means of a spring pawl 110 carried by the gear, which is adapted to engage a notch 111 formed in the periphery of the sleeve 109. As a result of the gearing described, when the pinion 106 is rotated in a counter-clockwise direction the gear 107 is rotated in a clockwise direction, and by means of the pawl 110 rotates the sleeve 109 in a clockwise direction, as shown in Fig. 12, and serves to return the register indicators 3 and 4 to their zero indications. As described above, the operating members 23 and 25 of the register are blocked against actuation when the shaft 12 is rotated from its normal position, and this locked condition continues during the entire re-setting operation, which consists in a complete rotation of the shaft 12. When the re-setting handle 11 is moved around to the left, the pinion 106 is moved in a clockwise direction, thus rotating the gears 105 and 107 in a counter-clockwise direction, for which motion the pawl 110 does not operate the sleeve 109, but recedes from the notch 111 on the periphery of the sleeve 109. The shaft 104 has secured to its left-hand end, in addition to the disk 103 and the gear 105, a disk 112 which has formed in its periphery a cam notch 113 in which the lower left-hand end of a lever 114 pivoted to the frame of the recorder at 116 is normally held by the action of a spring 117. The left-hand end of the lever 114 has pivoted thereto at 115 a pawl 118 normally disposed so that its nose is slightly back of the nose of the pawl 110 and resting against the periphery of the sleeve 109. From the construction described it will be apparent that motion in either direction of the shaft 104 will move the lever 114 around to the right until its left-hand end rests upon the periphery of the disk 112, and that such motion therefore will move the pawl 118 in a direction to rotate the sleeve 109 around to the right. When the shaft 104 is moved in a clockwise direction this motion of the pawl 118 does not serve to move the sleeve 109, since such sleeve is actuated at this time by the pawl 110, but for motion in a counter-clockwise direction of the shaft 104 and motion in a similar direction of the gear 107 and the pawl 110 the pawl 118 serves to rotate the sleeve 109 around to the right by engagement with the notch 111 a sufficient amount to lock the registering mechanism against actuation. When the re-setting handle 11 is rotated to the left this motion may be continued until a pin 119 carried by the disk 112 engages a spring hook 120 pivoted to the frame-work of the recorder at 121, which engagement prevents further rotation of the shaft 104 and therefore prevents further rotation of the re-setting handle 11. For this position of the parts the notch 102 is in a position to permit the hook 101 to be moved into it under the influence of the spring 40', shown in Fig. 4, and this is the normal condition of the mechanism just described when the recorder is not in use, as a result of which the register-actuating mechanism is locked against operation, and the re-setting handle is also locked against actuation. The parts just described in connection with Fig. 12 are shown in the position they occupy at the end of each re-setting operation, and during a re-setting operation the gears 105 and 107 each makes a complete rotation, as a result of which, since the ratio of the pinion 106 to such gears is one to two, and the ratio of the bevel-gears 94 and 95 is one to one, the re-setting handle 11 makes two complete rotations for each re-setting operation. During the re-setting operation the pin 119 moving in a clockwise direction engages the beveled outer surface of the right-hand end of the hook 120 and rotates such hook upon its pivot against the action of the spring normally holding it in the path of the pin 119.

Figure 18:
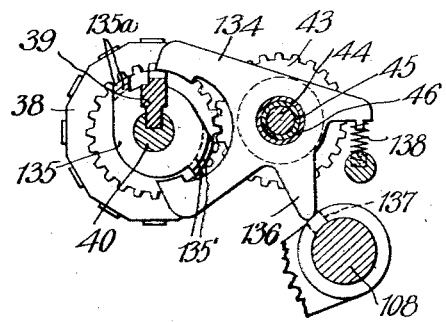
Fig. 18 is a detail view of tumbler mechanism used to coöperate with the identification key, such tumblers being shown in their releasing position and the identification key being shown in its printing position.
Figure 19:
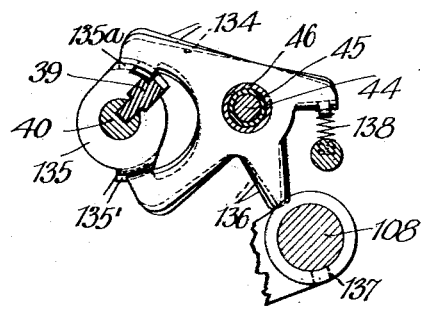
Fig. 19 is a view similar to Fig. 18, the tumblers and key being shown in their released position.

The shaft 108 has secured to its right-hand end a gear 122, as indicated in Fig. 6, and this gear 122 is adapted to be engaged by one of the spring pawls 123 and 124 pivoted to the frame-work of the recorder at 125, depending upon the position of the sliding bar 126. The bar 126 is normally in the position indicated in Fig. 6, and for this position a pin 127 carried by such bar engages the right-hand end of the pawl 124 to move it out of engagement with the gear 122, and for this position of the bar 126 the pawl 123 is free to engage the gear 122 under the influence of the spring 128. For this condition, therefore, motion of the re-setting handle 11 is permitted by the pawl 123 around to the right, and motion to the left is prevented. When the bar 126 is moved downward by means of the hook 129 secured to its lower end a projecting lug 130 carried by the upper end of the bar 126 engages a downwardly extending arm 123' formed on the pawl 123 and moves it out of engagement with the gear 122, and at the same time the pin 127 is withdrawn from the right-hand end of the pawl 124, and the spring 128 serves to move such pawl 124 into engagement with the gear 122, as shown in Fig. 9, for which condition motion of the re-setting handle is permitted only in a direction around to the left. When the pin 127 is moved downward by means of the hook 129 it engages one arm of a bell-crank lever 131 pivoted at 132 to the frame-work of the recorder and normally held in position to engage the key escutcheon 88 by a spring 133 to prevent motion of such escutcheon from its printing to its inoperative position. When the pin 127 engages the bell-crank lever 131 it moves such lever around to the right upon its pivot and disengages the lever from the key escutcheon 88, for which condition the key escutcheon and the shaft 40 carrying the same are free to be rotated to their inoperative position when the notch 102 is brought into alinement with the hook 101 shown in Fig. 12, providing the conductor's identification key 39 is properly in position in the key escutcheon 88. If at this time the conductor's key is not in the escutcheon 88 the escutcheon is retained in its printing position by means of tumblers 134, shown in plan view in Fig. 4 and in detail in Figs. 18 and 19. The tumblers 134 are mounted upon the tube 46 supported by the shaft 44 above described, and extend above and below a collar 135 secured to the shaft 40 in a position to receive the inner end of the conductor's identification key 39. The tumblers 134 have formed upon them rearwardly extending projections 136 adapted to be engaged by a cam 137 carried by the shaft 108, and when the tumblers are not engaged by the cam 137, individual springs 138 serve to move the outer ends of the tumblers into engagement with the key 39. The parts are so proportioned that when the re-setting handle is moved around to the right to a position to unlock the register-actuating mechanism the cam 137 is brought into a position to raise all of the tumblers 134 away from the key 39, which motion, however, does not release the collar 135, since the tumblers at this time lie in the path of the projections 135' formed on the rear side of such collar. This position of the tumblers, however, permits the conductor's key 39 to be inserted, if it was not properly inserted when he began operating the recorder. With the key 39 properly in place, the tumblers 134 resting upon its outer edge are held in proper position so that they clear not only the projections 135' on the rear face of the collar 135, but also the projections 135ᵃ formed on the front of such collar, and thus when the shaft 40 is otherwise released the tumblers do not prevent its motion to its inoperative position, as shown in Fig. 19. When, however, the conductor's key 39 is not in place in the escutcheon 88 the tumblers 134 under the action of the springs 138 rest upon the surface of the collar 135 and engage the projections 135ᵃ, which prevents motion of the shaft 40 to its incperative position, shown in Fig. 19.

The connecting plug 97 has formed therein a groove 97' adapted to be engaged by a spring catch 139 pivoted to a sector 140 at 141, as indicated in Figs. 6 and 9, the sector 140 being carried by the escutcheon 88. The latch 139 is so conformed on its lower edge that when the escutcheon 88 is in its printing position the connecting plug 97 may be inserted through the bevel gear 95, the latch 139 serving to engage the plug when in position to prevent its withdrawal. The connecting plug can only be released by motion of the escutcheon 88 to its inoperative position, for which position the latch 139 is moved out of the path of the plug 97, which may then be withdrawn by the conductor. The notch 97' is also engaged by the sliding bar 126 when such bar is not in its upper position, as a result of which it is necessary that such bar be in its normal position before the plug 97 can be withdrawn through a clearance 126' formed in such bar, as indicated in Figs. 9 and 10, for this purpose. A second clearance 126ᵃ is provided in the bar 126 to permit the plug 97 to be rotated when the bar 126 is in its lower position, but this clearance is not large enough to permit the withdrawal of the plug from the recorder.

The projecting lug 130 carried by the upper end of the sliding bar 126 has pivoted thereto at 142, as shown in Figs. 5, 6, 9 and 10, a spring dog 143, the left-hand end of which is so conformed as to engage the right-hand end of the lever 144 when the sliding bar 126 is moved in a downward direction. The lever 144 is rigidly secured to the right-hand end of the shaft 70, as a result of which the engagement described between the dog 143 and the lever 144 moves the platen 74 away from the record strips against the action of the spring 76, which motion continues until the right-hand end of the dog 143, as shown in Figs. 5, 6 and 9, engages the cam plate 145 secured to the recorder frame 66, which engagement rotates the dog 143 upon its pivot against the action of the spring 146, as shown in Fig. 9, thereby causing disengagement of the dog from the lever 144. The lever 144 being thus released, the platen 74 is moved violently in the direction of the recorder number, the date, indications, and the conductor's identification mark, and, as above described, the inertia of the platen 74 sufficiently overcomes the springs 73' to force the record strips against the printing characters referred to in a manner to imprint upon the record strips such characters. When the sliding bar 126 is again moved to its upper position, the left-hand end of the dog 143 yields under the action of the spring 146 to pass the right-hand end of the lever 144 to again come into operative position relatively to such lever.

The sliding bar 126 is controlled as to the direction of its motion by means of a spring pawl 147, shown in Figs. 5, 6, 8 and 9, as follows: The shaft 104 has secured to its right-hand end a disk 148, a mutilated gear 149 and a flat slotted member 150, as indicated in Figs. 6, 8 and 9. The extreme right-hand end of the shaft 104 pivotally supports the pawl 147, which is flattened on its inner end to engage a bar 151 disposed in the slot formed in the member 150, and this bar is held in position against the flattened surface referred to by means of a spring 152. Thus, motion in either direction of the pawl 147 from its normal position is permitted. When the re-setting handle 11 is in a position to unlock the register-actuating mechanism, above referred to, the shaft 104 occupies the angular position indicated in Fig. 6, and for this position the sliding bar 126 is free to be moved in a downward direction, and when so moved a ratchet 126ᵇ carried by the bar 126, as shown in Figs. 9 and 10, engages the pawl 147, which serves to prevent upward motion of the bar 126 after it has been moved downwardly. It is to be observed that the ratchet 126ᵇ and the pawl 147 engage each other before the bar 126 is moved to its extreme lower position, and that when once engaged motion of the bar 126 can only be effected in a downward direction for this condition of the pawl 147, until its extreme lower position is reached, and that the sliding bar is locked in this position until the re-setting handle 11 is rotated to the left, which is the only direction of motion now permitted owing to the engagement of the pawl 124 with the gear 122 and the disengagement of the pawl 123 from such gear, caused by the downward motion of the sliding bar 126. When the re-setting handle is moved to the left as far as it can be rotated, the shaft 104 is moved sufficiently in a clockwise direction, as shown in Figs. 6 and 9, to rotate the pawl 147 to the position indicated in Fig. 9, for which position the ratchet 126<sup>b</sup> is released and the sliding bar 126 may be moved upward. When the bar is thus moved, the ratchet 126<sup>b</sup> again engages the pawl 147, and, as before, when once engaged motion in the opposite direction of the sliding bar is prevented, and it can only be moved to its extreme position, which for this condition of the apparatus is its extreme uppermost position. When thus moved to its upper position, as above described, the sliding bar 126 serves to again bring the pawl 123 into engagement with the gear 122 and to remove the pawl 124 from engagement with such gear, and thus operation of the re-setting handle is permitted only to the right.

The right-hand end of the feed roll 54, as shown in Figs. 6 and 11, has secured thereto a gear 153 with which the gear 65 meshes when the portion of the frame 67 is in operative position relatively to the portion 66 of such frame. The two portions of the frame are held in this position by means of hooks 154 secured to the ends of a shaft 155 to prevent separation of the frame during the printing operation. The shaft 155 is carried by the portion 66 of the framework, and has connected thereto a spring 156, as shown in Fig. 4, which maintains the hooks against stops 157 in position to engage a rod 158 carried by the portion 67 of the framework, as shown in Fig. 5. The gear 153 meshes with an idle gear 159, which in turn meshes with a gear 160 supported from the framework 66 by means of a stud 161. The gear 160 has rigidly secured to it a ratchet wheel 162, adapted to be engaged by a spring pawl 163 carried by the reciprocable rod 176, to advance the feed roll 54, and thus the record strips for each actuation of the printing mechanism in a manner to be described. The gear 160 has also rigidly secured to it a second ratchet wheel 165, as shown in Fig. 7, adapted to be engaged by a spring pawl 166, pivoted at 167 to a disk 168, loosely mounted upon the stud 161 and free from the gear 160 and the ratchet wheels carried thereby. The ratchet wheels 162 and 165 are separated by means of a disk 169, to prevent interference between the operation of the pawls 163 and 166. The disk 168 is rigidly connected to a gear 170, meshing with an idle gear 171, which is mounted upon a stud 172, and has rigidly connected to it a gear 173. The gear 173 lies in the path of the mutilated gear 149, and when the pawl 147 is removed from the position indicated in Fig. 6 to the position indicated in Fig. 9 the gear 149, by its engagement with the gear 173, drives the feed roll 54 through the pawl 166 and ratchet wheel 165 to advance the record strips a sufficient amount so that the last impression of the printing characters is fed beyond the paper guides 55, 56 and 59 in a position to be removed from the recorder. The disk 148 carried by the shaft 104 serves to prevent rotation of the gear 173 by engaging cutaway portions therein when the gear 149 is not in engagement with such gear 173.

The shaft 104 within the recorder framework is cut away at two portions, as indicated at 104<sup>a</sup> in Fig. 4, to form cam surfaces to engage the upper ends of levers 174, as shown in Fig. 11. The cam surfaces formed in the shaft 104 are indicated in dotted lines in Fig. 11, about three quarters of the material of the shaft being cut away at these points to leave the V-shaped cam members for operating the levers 174. The levers 174 are pivotally supported at 175 within the framework of the recorder, and carry at their lower ends a rod 176 extending transversely of the recorder, which rod carries upon its right-hand end, as shown in Fig. 4, the pawl 163, above referred to; and at its left-hand end this rod has pivotally secured thereto a dog 177. A spring 178 is disposed around the rod 176 to maintain the dog 177 in engagement with a roller 179, carried by the left-hand wall of the recorder framework, as shown in Fig. 12. The dog 177 is provided at its outer end with a roller 180 adapted when the rod 176 is reciprocated by motion of the lower ends of the levers 174 to engage a lever 181, pivoted to the framework 67 at 64. The lever 181 is disposed under the left-hand end of the platen 79, as shown in Fig. 12, and when moved, by means of the dog 177, serves to raise the platen 79 against the action of its returning spring 79<sup>a</sup>. The dog 177 is provided with a cam surface 177<sup>a</sup>, adapted to engage the roller 179 when the platen 79 has been sufficiently raised, and continued motion of the rod 176 serves to move the dog 177 upward as a result of the engagement between the cam surface 177<sup>a</sup> and the roller 179 to disengage the roller 180 from the upper end of the lever 181, for which condition the spring 79<sup>a</sup> serves to forcibly return the platen 79 to make an impression of the characters upon the wheels 29, 33 and 36, which are in printing position at this time. The motion of the rod 176, caused by the levers 174, by operating the pawl 163, serves to advance the record strips the distance corresponding to one record thereon. The lower ends of the levers 174 are conformed, as indicated in Fig. 11, to engage the underside of a locking bar 183, supported by a screw 184 from a cross-bar 185 of the framework of the recorder in such a manner that it may be moved into or out of engagement with notches formed in the wheels 29, 33 and 36 between the printing characters carried by such wheels. A spring 186 serves to withdraw the locking bar 183 from engagement with the wheels 29, 33 and 36 when the levers 174 are moved to their normal position, which is accomplished by the force exerted by such spring 186 upon the lower ends of such levers when the shaft 104 is in its normal position.

The shaft 104 carries near its right-hand end, as shown in Fig. 4, a projecting cam 187 adapted to engage a projection 188ª formed on a lever 188, which lever is normally held in engagement with the shaft 104 by a spring 189, and has pivotally secured to its left-hand end, as shown in Fig. 11, a spring pawl 190 engaging the ratchet wheel 191, carried by the units wheel 36. The detailed construction of the cam 187 and the parts actuated thereby is shown more clearly in Fig. 21.

The cam portions 104ª formed in the shaft 104 are so disposed relatively to the cam 187 and the dog 177 that by operation of the re-setting handle 11 to the right the trip recording wheels 36 are first advanced one unit, then the pawl 163 advances the record strips an amount corresponding to one record, and then the platen 79 is actuated to make a record from the wheels 29, 33 and 36. Since the shaft 104 is rotated for motion of the re-setting handle 11 either to the right or to the left, it follows that a record of the wheels 29, 33 and 36 is made for either direction of motion, one surface of the cams 104ª serving to operate the levers 174 for one direction of motion of the re-setting handle 11, while the other surface of such cams operates to perform a similar function for the other direction of motion of the re-setting handle 11. The only difference in the operation of the mechanism for the two directions of motion of the re-setting handle is that when such handle is rotated to the left the cam 187 does not operate the pawl 190, since for motion to the left of the re-setting handle the shaft 104 does not make a complete rotation.

Figure 25:
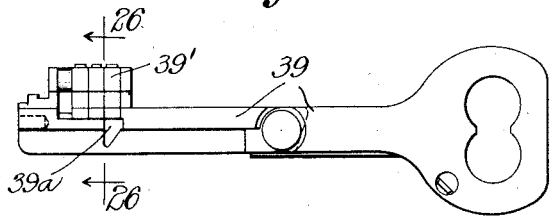
Fig. 25 is a side view of the conductor's identification key.

A latch 192 is pivoted at 193 to the framework 66 so as to lie in the path of the conductor's identification key 39 when the latter is in its printing position, as indicated in Figs. 4 and 20. The latch 192 is beveled at its upper end so that the key 39 may be inserted in the escutcheon when the latter is in its printing position, provided the sliding bar 126 is in its upper position, and when the key 39 is thus placed in the escutcheon a spring 194 moves the latch 192 into engagement with the notch 39ª formed in the side of the key 39, as indicated in Fig. 25, and subsequent removal of the key from the escutcheon is thus prevented while the escutcheon remains in its printing position. A rocking member 195 is pivotally supported at 196 to the framework 66 in a position such that when such rocking member is moved to the position indicated in dotted lines in Fig. 20, by means of the arm 197 secured to the rod 198 by rotation of such rod, the latch 192 cannot be moved from the path of the key, and thus for this condition of the parts the key cannot be inserted into the escutcheon when the latter is in its printing position. The rod 198 has secured thereto outside of the right-hand wall of the framework 66 a second arm 199 disposed in the path of a projection 126ᶜ carried by the sliding bar 126, as a result of which when the sliding bar 126 is moved to the position indicated in Fig. 9, the rod 198 is rotated against the action of a suitable returning spring to cause the arm 197 to move the rocking member 195 into its locking position. From this it follows that if the key 39 is not properly inserted in the key escutcheon when the latter is moved to its printing position to release the re-setting key that it cannot be subsequently inserted in the key escutcheon when the sliding bar 126 is in its lower position, but can only be inserted in such escutcheon when the sliding bar is in a position to permit normal operation of the registering mechanism.

As indicated in Figs. 5, 22, 23 and 24, the re-setting shaft 93 has secured near its upper end a sleeve 200, which has a downwardly extending semi-circular portion adapted to engage a corresponding portion formed upon a sleeve 201, into the upper end of which the lower end of the re-setting shaft 93 extends. The sleeve 201 is secured to a rod 202, and between the rod 202 and the shaft 93 a spring 203 is disposed, which normally maintains the rod 202 and shaft 93 in a separated condition longitudinally, which separation is limited by the engagement of the collar 201ª formed upon the sleeve 201 with the supporting wall 204 of the re-setting shaft. The formation of the sleeves 200 and 201 relatively to each other permits longitudinal motion of the sleeves, and thus of the rod 202 relatively to the shaft 93 against the action of the spring 203, to release stop mechanism provided for limiting the motion of the re-setting handle 11, which is rigidly secured to the lower end of the rod 202. The rod 202 has secured thereto within the frame 204 a gear 205, which meshes with a larger gear 206 carried by a shaft 207 supported by the framework 204. The shaft 207 has loosely mounted thereon a stop dog 208 connected by a spring 209, with a disk 210 rigidly secured to the gear 206.

Figure 22:
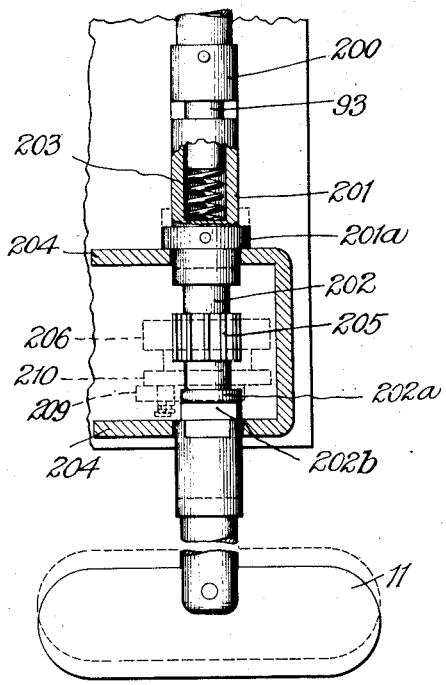
Fig. 22 is a view of the resetting handle showing in dotted lines the lock used to limit its motion.
Figure 23:
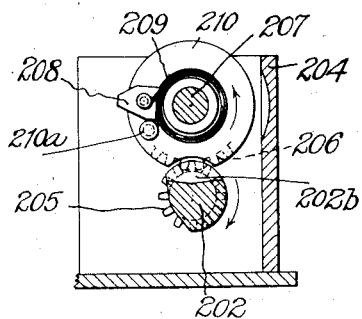
Fig. 23 is a detail view of the locking mechanism employed in connection with the resetting handle, the lock being shown in its position to permit motion of the resetting handle to the right.
Figure 24:
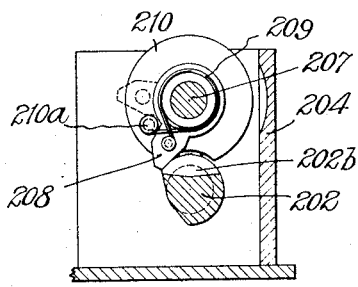
Fig. 24 is a view similar to Fig. 23 showing the lock in its position to prevent further motion to the right of the resetting handle until it is actuated to release the lock.

The operation of the re-setting handle 11 is normally to the right to re-set the registering mechanism and print the trip record, and after any such re-setting operation the parts occupy the position indicated in Fig. 24, in which the stop 208 rests against the enlarged cylindrical portion 202ª of the rod 202 and also against a post 210ª carried by the disk 210, to which one end of the spring 209 is secured. As a result further motion to the right of the re-setting shaft is prevented, since the gear 206 cannot be further rotated to the left. When it is desired to again operate the re-setting handle 11 to the right it is moved upward to the position indicated in dotted lines in Fig. 22, for which position the clearance 202$^b$ is brought opposite to the stop 208, which is thereby permitted, under the influence of the spring 209, to move to the position indicated in Fig. 23, after which the rod 202 and shaft 93 may be rotated to the right until the parts again occupy the position indicated in Fig. 24. As shown in the present modification, the parts are so proportioned that the re-setting handle 11 is moved through two complete rotations to effect the re-setting operation, and the stop members shown in Figs. 22, 23 and 24 are so conformed as to correspondingly limit the motion of the re-setting handle. The motion that may be imparted to the re-setting handle to the left after the several locking mechanisms have been properly actuated to permit such motion is practically one and three quarter rotations, the amount of this rotation being determined by the position of the pin 119 in the disk 112, and the relation of the notch 102 to the locking hook 101. It is obvious, however, that other proportions of mechanism may be used for any particular case by which different amounts of motion in either direction may be imparted to the re-setting handle to operate the mechanism controlled thereby.

The operation of my recording mechanism is as follows:

Normally, when the recorder is not in use, the mechanism is in a condition such that the fare registers 3 and 4 are in their zero position. The key escutcheon 88 is in its released position and the re-setting handle 11 is entirely disconnected from the re-setting and printing mechanism of the register and recorder. At this time the sliding bar 126 is in its upper position and the pawl 118 is in a position to move the shaft 12 to lock the register-actuating mechanism, while the pawl 110 has been moved around to the left, as shown in Fig. 12, away from the notch 111. For this condition of the apparatus the hook 101 is in the notch 102 and the pin 119 is in engagement with the spring stop 120. The lever 86 at this time is in a position to release the sliding cover 60, the latch 131 is in a position to engage the escutcheon 88 when it is moved to its printing position, and the latch 139 is out of the path of the connecting plug 97; the pawl 123 is in engagement with the gear 122 and the pawl 124 is held out of engagement with such gear; the pawl 147 is in the position indicated in Fig. 9, thus preventing motion of the sliding bar 126 in a downward direction; the tumblers 134 are resting upon the periphery of the collar 135; the latch 192 is released, and the cam 187 is moved around to the right, as shown in Fig. 11, in a position to the right of the projection 188$^a$ carried by the lever 188. The record strips are supposed to have been properly threaded through the recording mechanism from the supply roll 52, as described above, so that the several thicknesses will occupy the relative positions indicated in Figs. 30 and 31 as they pass between the plates 57, 58 and the sliding cover 60—that is, the strips 52$^a$ and 52$^b$ are the ones that are coated on their rear faces as they pass upward between the plates 57 and 58 and the sliding cover 60, while the strip 52$^c$ is plain, and as a result the strip 52$^c$, which passes up between the plates 57 and 58, has its record printed upon it by means of the material carried by the back of the strip 52$^b$, while the strip 52$^b$, which passes up between the plate 52$^a$ and the sliding cover 60, has its record made upon it by means of the material coated upon the back of the strip 52$^a$. As shown in Fig. 30, the indication 52$^d$ is the trip number, the indication 52$^e$ represents the total reading of the cash recorder wheels 33, and the indication 52$^f$ represents the total reading of the transfer or ticket recording wheels 29 at the end of trip number 60. The indication 52$^g$ is the conductor's identification mark carried by the key 39, the indication 52$^h$ is the recorder number, and the indication between them the date upon which the record was made. The several indications referred to are separated upon the record strips by vertical lines 52$^k$ made upon the strips by means of the flanges 61' carried by the feed roll 61, as above described, in order that the record may be more easily read.

Figure 28:
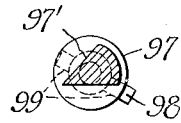
Fig. 28 is a sectional view taken along the line 28—28 of Fig. 27.

When it is desired to operate the recorder in the normal manner the conductor, who has a connecting plug and identification key, for which he is held personally responsible, bearing corresponding identification marks, first inserts the connecting plug in the gear 95 and pushes it through such gear until the end of the plug is in engagement with the slotted member 100 carried by the right-hand end of the shaft 96. The conductor then inserts his identification key 39 into the escutcheon 88 while such escutcheon is in its released position, after which he moves the key and escutcheon to their printing position, in which position they are held by the locking member 131. For this position the latch 139 serves to retain the connecting plug 97 in position to connect the gear 95 and the shaft 96. Motion of the escutcheon 88 from its released position to its printing position removes the hook 101 from the notch 102, thus releasing the shafts 96, 104 and 108, which may be actuated by rotating the re-setting handle 11 to the right. When the re-setting handle has been rotated practically one and three-quarter turns to the right the lever 114 engages the notch 113, thus permitting the re-setting shaft 12 to move to a position to unlock the register-actuating mechanism, and the pawl 110 is rotated around to the right, as indicated in Fig. 12, to engage the notch 111 for this position of the shaft 12. This motion of the re-setting handle also serves to raise the tumblers 134 away from the key 39 and to move the pawl 147 around to the position indicated in Fig. 6. During the reversal of the pawl 147 the reduced portion of the plug 97 formed by the groove 97′ occupies such a position relative to the clearance 126′ formed in the bar 126 that actuation of the sliding bar during such reversal is impossible. The flat surfaces at the bottom of the groove 97′, shown in Fig. 28, permit motion of the sliding bar 126 when the re-setting handle is in either its register-releasing position or its extreme left-hand position. The motion imparted to the shaft 104 by the one and three quarter turns referred to actuates the levers 174 to print the condition of the wheels 29, 33 and 36, thus beginning the new record with the reading of the trip number, total cash fares and total transfers at this time. This rotation of the shaft 104 also serves to move the cam 187 from the right of the projection 188ᵃ around to the left of such projection without actuating the lever 188, since the direction of motion of the shaft 104 is around to the left, as indicated in Fig. 11. If the car upon which the recorder is located is to go in a direction corresponding with the direction of the trip indicator 7, the re-setting handle 11 is not further operated, thus leaving the trip number the same as the last reading made on the record removed from the recorder by the preceding conductor. If, however, the car is to proceed upon a new trip or in a direction the reverse of that indicated by the trip indicator 7, the re-setting handle is first moved upward to release the stop 208, after which such handle is turned two complete rotations to the right, at which time the stop 208 is operative to prevent further rotation to the right, and this motion serves to rotate the shaft 96 two rotations and the shafts 104 and 108 one rotation, thus bringing all of the parts to the same position, as described, at the end of the operation of releasing the registering mechanism by the one and three-quarter rotations to the right, above referred to. By this motion of two rotations to the right of the re-setting handle, however, the trip record wheels 36 have been advanced one unit, the pawl 163 has moved the record strips along a space corresponding to one record, and the platen 79 has been again actuated by means of the levers 174, thus making a second record upon the record strips identical with the first one, with the exception that the trip number is one greater than was the first trip number.

The rotation of the shaft 104 due to the two rotations to the right of the re-setting handle 11 moves the pawl 147 through an entire rotation, and during this rotation the reduced portion of the plug 97 formed by the groove 97′ by its engagement with the clearance 126′ prevents motion of the sliding bar 126, as above described. Fares are now registered in the usual manner, and as each cash fare is registered the indicators 3 and 5 are each advanced one unit, and at the same time the recording wheels 33 are similarly advanced one unit, and as each transfer or ticket is registered the indicators 4 and 6 are each advanced one unit, and at the same time the recording wheels 29 are correspondingly advanced one unit. This continues to the end of the trip, at which time the re-setting handle 11 is again rotated to the right two complete turns, as above described, thus making a record of the total cash fares, the total tickets or transfers, and the next trip number. This operation is repeated until the conductor leaves the car, which may be either when the car is withdrawn from service or in the middle of a trip, without withdrawing the car from service. Assuming that the conductor leaves the car when it is withdrawn from service, it is, of course, desirable to clear the register, and this is done by first turning the re-setting handle 11 to the right two complete rotations, as above described, thus making the corresponding record upon the record strips. After this the hook 129 is pulled downward, which, by the engagement of the dog 143 and the lever 144, operates the platen 74 to make a record upon the strips of the registering number, the date and the conductor's identification mark. This motion of the sliding bar 126 also serves to reverse the relation of the pawls 123 and 124 relatively to the gear 122, as a result of which the pawl 124 is in engagement with such gear, while the pawl 123 is held out of engagement with the gear, as indicated in Fig. 9. This motion of the sliding bar 126 also serves to lock the latch 192, which is in engagement with the key 39, to prevent operation of such latch, although, with the key in proper position in the escutcheon 88, the locking of this latch 192 performs no function. By this motion of the sliding bar 126 the plug 97 is prevented from removal, even if the latch 139 is removed from engagement with such plug. Thus, at this time the key 39 is retained in the escutcheon 88 by the operation of the latch 192. For this relation of the apparatus the sliding bar 126 cannot be moved in an upward direction, and motion of the re-setting handle 11 is possible only in a direction to the left owing to the relation of the pawls 123 and 124 relatively to the gear 122. As a result the conductor turns the re-setting handle to the left one and three-quarter turns, which is as far as it will go owing to the engagement of the pin 119 with the spring stop 120, and this rotation to the left, as above described, serves to advance the record strips an amount corresponding to one record, to actuate the platen 79 to make a record of the total fares and the trip number, and also, by means of the mutilated gear 149, to feed the record strips a sufficient amount to bring the record made by the platen 74 outside of the guides 56 and 59, thus making the complete record available to the conductor. At the end of the one and three-quarter rotations to the left, when the pin 119 is brought into engagement with the stop 120 and the hook 101 is in alinement with the notch 102, the spring 40' serves to rotate the shaft 40 to carry the escutcheon 88 and the identification key 39 to their released position, since at this time the locking member 131 is in its released position, as indicated in Fig. 9, due to the position of the sliding bar 126, and the surfaces formed upon the end of the key 39 prevent the engagement of the tumblers 134 with the projections 135ª formed on the collar 135. This removes the latch 139 from the path of the connecting plug 97, which, however, is still retained in the recorder by its engagement with the sliding bar 126. Thus, since the key 39 is rotated away from the latch 192 such key may be withdrawn from the recorder by the conductor. During the one and three-quarter rotations to the left of the re-setting handle 11 the pawl 147 is rotated from the position indicated in Fig. 6 to the position indicated in Fig. 9, and during this rotation the reduced portion of the plug 97 engages the sliding bar 126 in the clearance 126ª to prevent upward motion of such bar during this operation of the re-setting handle. To remove the connecting plug from the recorder it is therefore necessary to move the sliding bar 126 to its upper position, which is the only operation of the mechanism that is possible, and when the sliding bar 126 is in its upper position the connecting plug may be withdrawn, and thus taken away by the conductor.

The motion of the escutcheon 88 to its released position releases the locking member 86 and permits the conductor to move the sliding cover 60 to its upper position, thus actuating the cutting-guide 59 to bring it into engagement with the two outer record strips, which he proceeds to remove as his record of the work done by him on the car. The inner record strip 52ᶜ is retained in the recorder, and as one complete record after another is made by succeeding conductors this strip passes up between the plates 57 and 58 into the tube 80, and thus into the receptacle 81, where it accumulates until removed by an inspector or auditor having a proper key to open the recorder to remove such record.

If instead of leaving the car when it is withdrawn from service the conductor is relieved for any reason during the operation of the car, and it is desired to have the same trip number continued on the succeeding conductor's record without re-setting the register indicators, the sliding bar 126 is pulled down without moving the re-setting handle 11 two rotations to the right to clear the register, and after this the re-setting handle 11 is rotated one and three-quarters rotations to the left, as above described, the result being that the trip indicator 7 is not reversed as to direction indication, and the trip recorder wheels 36 are not advanced, the record printed at this time showing the same trip number as the last preceding record. The operation of releasing the conductor's identification key and connecting plug is, however, precisely the same as above described. When the relieving conductor makes his first record the one and three-quarter turns of the re-setting key to the right serves merely to unlock the register-actuating mechanism and to print the condition of the record wheels 29, 33 and 36 without, however, changing the condition of any of these wheels or the condition of the register-indicating mechanism, as a result of which the second conductor's record begins where the preceding conductor's record ended and continues on the same trip, the two records showing that the last reading of the first conductor's record and the first portion of the second conductor's record must be used in determining the total record for that particular trip.

If for any reason the conductor, in attempting to unlock the register-actuating mechanism by manipulation of the escutcheon 88, omits to properly insert his identification key 39 in such escutcheon, it is possible to operate the register and recorder, providing the connecting plug 97 has been properly inserted to give control of the unlocking mechanism and the re-setting mechanism to the re-setting handle 11. The escutcheon 88 may be moved to its printing position without inserting the key 39 either before the connecting plug 97 has been placed in proper position in the gear 95 or after such plug has been so located. If the escutcheon 88 is moved to its printing position before the insertion of the connecting plug, it is retained in such position by the lock 131, but inasmuch as the re-setting handle 11 is still entirely free from the re-setting and unlocking mechanism the registering mechanism cannot be placed in its normal or operating condition. It is therefore necessary to insert the connecting plug, which may be done, owing to the conformation of the latch 139 carried by the escutcheon 88, and when the connecting plug is thus inserted it is held in its operative position by such latch, as above described. With the parts in this position the register may be released by means of the re-setting handle 11 and actuated as described above, the only difference being that at the end of the conductor's work he has failed to insert his identification key, actuation of the re-setting handle 11 one and three-quarter rotations to the left after moving the sliding bar 126 to its lower position will fail to release the escutcheon 88, since at this time the tumblers 134 are not properly supported out of the path of the projections 135$^a$ on the collar 135, and such tumblers, therefore, serve to engage the projections 135$^a$ and prevent rotation of the escutcheon 88 from its printing position to its released position, although at this time the other locking devices associated with the shaft 40 are in their releasing position. As a result it is impossible for the conductor to remove his connecting plug 97 from the recorder, and this affords a positive indication of the one who has improperly operated the machine if for any reason he leaves the same in this condition. Since the escutcheon 88 is retained substantially in its printing position, it follows that the sliding cover 60 is not released and that therefore the conductor cannot remove his record from the recorder.

If upon discovering that he cannot remove his connecting plug 97, and that therefore he has improperly operated the recording mechanism, the conductor desires to correct his error, he may do so after moving the sliding bar 126 to its upper position by moving the escutcheon 88 so that it is engaged by the lock 131, for it is to be noticed that the clearance provided between the ends of the tumblers 134 and the projections 135$^a$ on the collar 135 has permitted a slight amount of motion toward its released position of the escutcheon 88 sufficient to cause engagement between the end of the hook 101 and the notch 102. After moving the escutcheon 88 into engagement with the lock 131, the conductor may release the register-actuating mechanism as before by turning the re-setting handle 11, and for any position of the re-setting handle 11, which serves to place the register-actuating mechanism in its operative condition, as has already been described, the tumblers 134 are raised out of the path of the projections formed upon the end of the conductor's key 39, and such key may therefore be inserted in the escutcheon 88 at such times. After properly inserting the key 39 in the escutcheon 88 the sliding bar 126 may again be moved to its lower position, and the re-setting handle 11 may be moved one and three-quarter rotations to the left, which results in printing the conductor's identification mark upon the record and subsequently releasing both the identification key and the connecting plug, as described above. It is to be noted that when the sliding bar 126 is in its lower position and the escutcheon 88 is in its printing position without having the identification key properly in place that such key cannot be inserted, which provides against the possibility of releasing the connecting plug by the insertion of the identification key after the operation of the sliding bar 126 to make a record that would normally include the conductor's identification mark. The conductor's identification key, however, may be inserted immediately before moving the sliding bar 126 to its lower position, assuming that the register-actuating mechanism has been released by means of the re-setting handle 11. When the re-setting handle 11 is not in a position to release the register-actuating mechanism, the tumblers 134 are in a position to prevent the insertion of the conductor's identification key to its operative position. From this it follows that if the conductor notices the incorrect condition of the apparatus after having started to use the recorder he may insert his identification key at any time before moving the sliding bar 126 to its lower position, at which time the re-setting handle 11 is in a position to release the register-actuating mechanism without making an imperfect record.

Fig. 32 illustrates the operation of the recorder when a first conductor, after having used the mechanism for several trips, is relieved during a trip without re-setting the register mechanism, the second conductor beginning his record where the first conductor ended, and it being necessary to consult the two records to determine the work done on the trip, which constituted, in part, the last work of the first conductor, while the remaining portion constituted the first work of the second conductor. As shown in this figure, the first conductor, in starting to use the register, made the record indicated at 211$^a$ which is identical with the record last made by the mechanism, and indicates that the first work done by the first conductor is upon trip number 60. At the end of this trip, by re-setting the register mechanism by means of the re-setting handle 11 the record 211$^b$ is made, which indicates that trip 60 is ended since the trip number printed in the record 211$^b$ is 61 instead of 60. This record indicates that during trip 60 the conductor has received four cash fares and no tickets or transfers. At the end of the second trip the register is again re-set and the record indicated at 211$^c$ is made, indicating that trip number 61 is ended, since the trip number now printed is 62, and the record shows that during trip number 61 two cash fares were received and eight tickets or transfers. During the trip indicated by the record 211ᶜ—that is, trip number 62, the first conductor is relieved, and in order to get his identification key and connecting plug, as a result of moving the sliding bar 126 to its downward position, the record 211ᵈ is made showing that the recorder making the record is No. 140, that the date is October 15th, and the conductor's number 710. After making the record 211ᵈ, motion of the re-setting handle 11 to the left to release the mechanism to remove the identification key and connecting plug makes the record 211ᵉ, and since the trip number printed in the record 211ᵉ is the same as that printed in the record 211ᶜ, it indicates that the register has not been cleared, and that therefore trip number 62 has only been partially completed, and, further, that conductor No. 710 has taken in two cash fares and six transfers or tickets during the portion of trip number 62 that he worked. The conductor's copy of the records just referred to is now available and may be removed by him from the recorder by opening the sliding cover 60, after which the second conductor who relieves him inserts his connecting plug and identification key and makes record 211ᶠ, which, it will be noticed, is identical with record 211ᵉ, which affords an indication that the second conductor is completing the trip begun by the first conductor before he left the car. At the end of this trip record 211ᵍ is made, which indicates that the second conductor took in one cash fare and two tickets or transfers during his portion of trip number 62, and that therefore during the whole of trip number 62 three cash fares and eight tickets or transfers were taken in by the two conductors. At the end of trip number 63 it is assumed that the second conductor withdraws the car from service, and, therefore, clears the register, which serves to make the record 211ʰ, which indicates, by the advance of the trip number from 63 to 64, that trip number 63 is ended, and that three cash fares and two tickets or transfers were received during such trip. The record 211ᵏ is then made by the second conductor by moving the sliding bar 126 downward, which indicates that the second portion of the complete record is the work of conductor No. 712, the date and recorder number being the same as before. After making the record 211ᵏ, the operation of the re-setting handle 11 to the left to release the second conductor's identification key and connecting plug makes the record 211ⁿ, which, by duplicating the record 211ʰ, indicates that the register mechanism has been re-set, and that therefore the registering and recording mechanism are in condition to begin trip number 64.

In the modified construction shown in Figs. 33 to 39, inclusive, the recorder mechanism is so constructed that the record which is retained in the recorder is wound upon a receiving reel, and fed at a different rate at the end of making any given record, from the record strips which are to be removed by the conductor from the recorder. As shown in this modification, the shaft 93, attached to the re-setting handle 11, is disposed between the side walls of the framework 66 instead of being disposed to the right of such framework, as above described.

Figure 35:
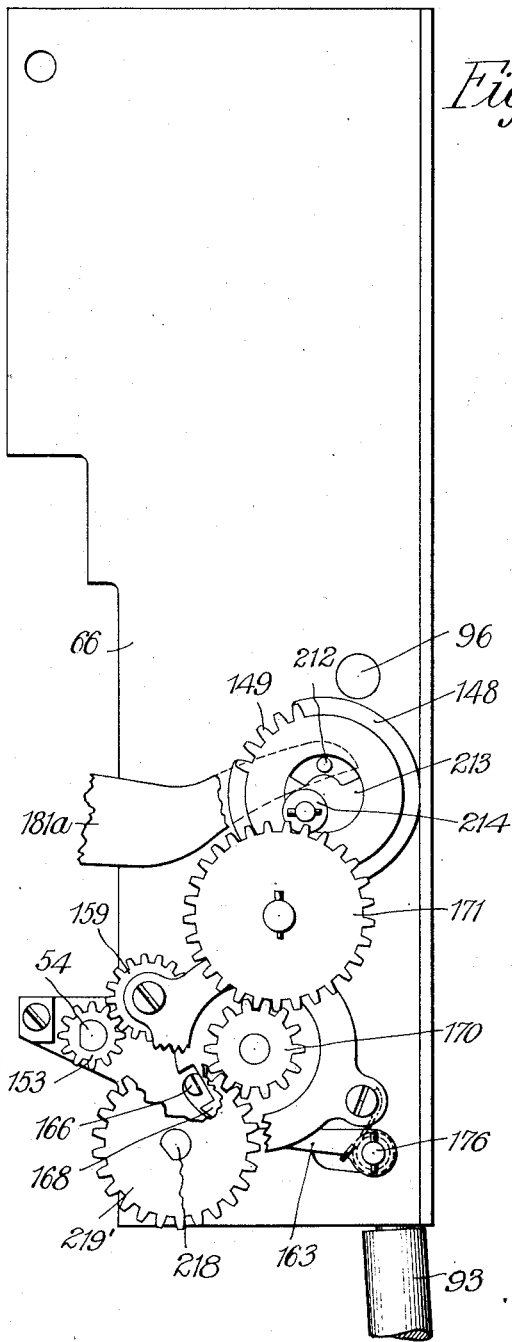
Fig. 35 is a right-hand side view of the parts shown in Fig. 33.

In this modification the shafts 96, 104 and 108 are driven in substantially the same way as above described, and the shaft 104, by its rotation, serves to operate the train of gearing shown in Fig. 35 in substantially the same way as does the corresponding train of gearing shown in Figs. 4 to 6, inclusive, to advance the feed roll 54 and gear 153 an amount corresponding to an individual record or an amount sufficient to make the completed record available for the conductor, depending upon the direction of rotation of the shaft 93. The gear 149 carries a pin 212 adapted to engage a sector 213 carried in a recess in the outer face of the gear 149. The sector 213 carries a roller 214 adapted to engage a lever 181ᵃ, by which one of the platens above referred to may be actuated. This construction provides that the lever 181ᵃ may be properly timed for either direction of motion of the shaft 93, as a result of the clearance between the pin 212 and the sides of the sector 213 with which it is adapted to engage.

Figure 26:
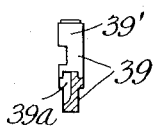
Fig. 26 is a sectional view of the conductor's key taken along the line 26—26 in Fig. 25.
Figure 33:
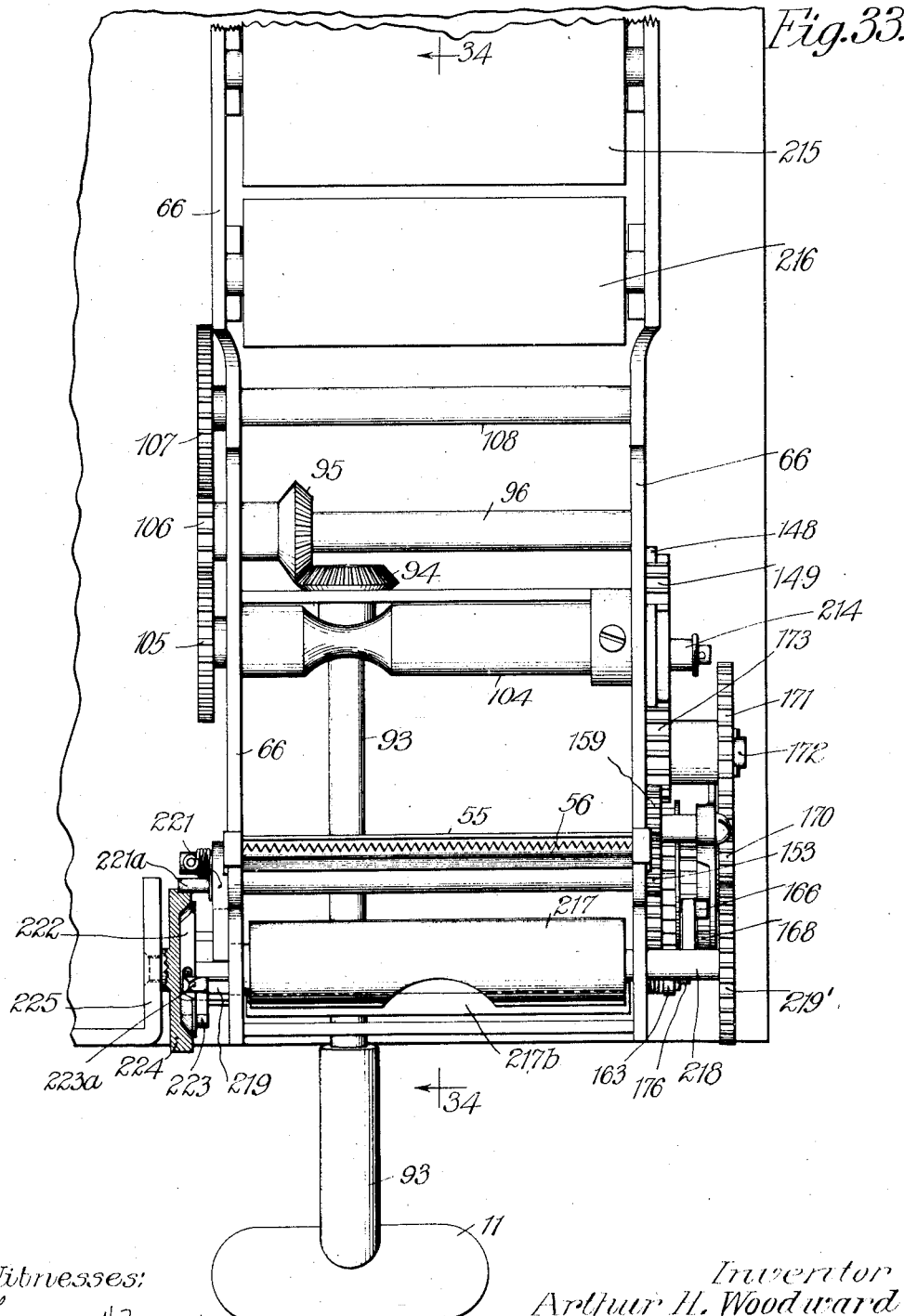
Fig. 33 is a plan view of a portion of a modified form of recording mechanism in which a special roller is employed for receiving the auditor's record.
Figure 34:
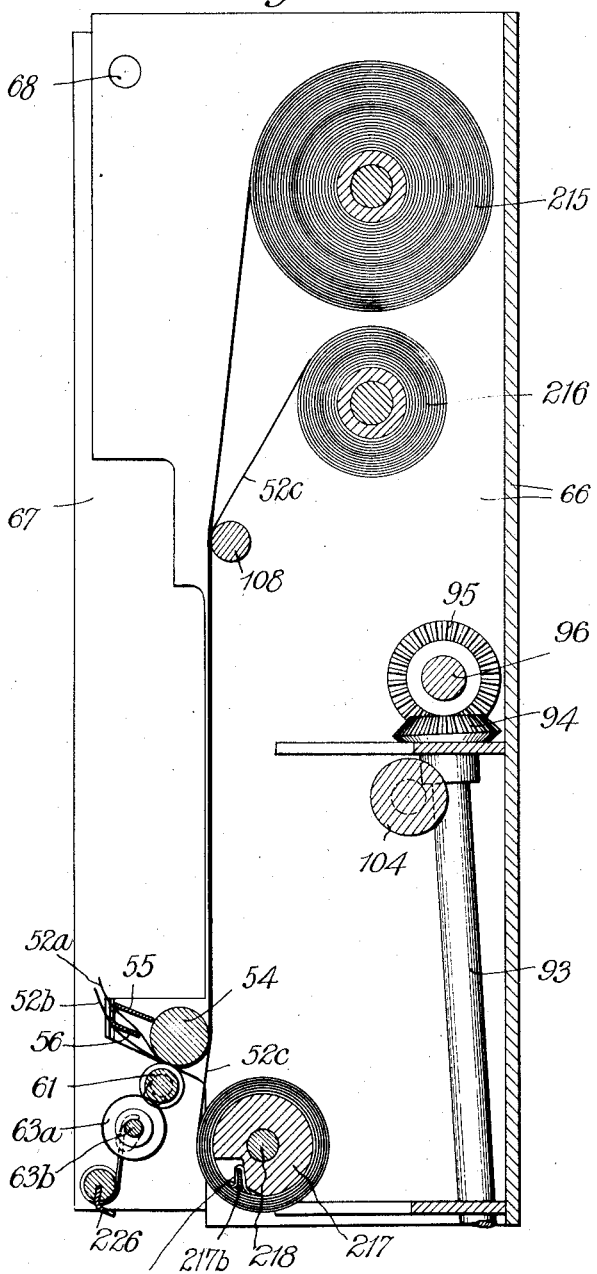
Fig. 34 is a sectional view of the parts shown in Fig. 33 taken along the line 34—34.

In this modified form of apparatus the record strips are fed to the recording mechanism from two supply rolls 215 and 216 suitably mounted in the framework 66. After passing the printing position the inner record strip 52ᶜ is wound upon a receiving roller or reel 217 loosely mounted upon a shaft 218, to the right-hand end of which, as shown in Fig. 33, a gear 219' is secured, such gear meshing with the gear 170 of the paper-feeding mechanism. The other record strips are conducted between the feed rolls 54 and 61, and thus through the guides 55 and 56, as above described. In this modification the feed roll 61 is held in engagement with the feed roll 54 by means of a roller 63ᵃ mounted upon a shaft 63ᵇ, which shaft tends to move toward the feed roll 61 under the influence of springs not shown. Roller 217 has secured to its left-hand end a ratchet wheel 219 adapted to be engaged by an actuating pawl 220, as shown in Figs. 36 and 37, such pawl being carried by the left-hand end of the shaft 176. As a result, when the re-setting handle 11 is moved in a direction to print the condition of the recorder at the end of each trip, the operation of the rod or shaft 176 advances the roller 217 a sufficient amount to advance the record strip 52ᶜ the space of an individual record, and at the same time the record strips 52ª and 52ᵇ are advanced by the feed rolls 54 and 61 a similar amount. A spring pawl 221 is provided to retain the roller 217 in the position to which it is advanced by the pawl 220. The shaft 218 carries upon its left-hand end a disk 222, which has pivoted thereto a spring pawl 223, also adapted to engage the ratchet wheel 219. When the re-setting handle 11 is rotated to the right the shaft 218 is so rotated as to move the disk 222 in a counter-clockwise direction, as shown in Figs. 36 and 37, as a result of which the pawl 223 is inoperative at this time. When, however, the re-setting handle 11 is rotated to the left the shaft 218 and disk 222 are rotated in a clockwise direction, as shown in Figs. 26 and 37, and the pawl 223 at this time serves to advance the ratchet wheel 219 and the roller 217 connected therewith an amount sufficient to move the record strip 52ᶜ so that the impression of the conductor's identification mark, the date and the recorder number are in advance of the printing position of the wheels 29, 33 and 36, shown in Fig. 4. This amount of advance of the record strip 52ᶜ will at once be understood to be less than that required for the strips 52ª and 52ᵇ, since the latter must be sufficiently advanced by motion to the left of the re-setting handle 11 so that the completed record is outside of the guides 55 and 56. This difference in advance of the record strips is secured by properly proportioning the several gears employed in the paper-feeding train above described.

The roller 217, as shown in Figs. 38 and 39, has formed therein a longitudinal groove 217ª adapted to receive a locking member 217ᵇ pivoted to the ends of the roller 217 at 217ᶜ. The locking member 217ᵇ is so proportioned relatively to the groove 217ª that when the end of the record strip 52ᶜ is drawn over the roller 217 with the locking member 217ᵇ in its outer position motion of such locking member into the groove 217ª serves to bind the record strip in the groove, and thus affords a positive engagement between the record strip and the roller 217. A releasing member 224 is rotatably supported by a bracket 225 in axial alinement with the shaft 218, and is provided with a plurality of cam surfaces such that when it is desired to remove the record strip 52ᶜ from the roller 217, by rotating the member 224 to the position indicated in Fig. 37 these cam surfaces engage the pins 220ª and 221ª carried by the pawls 220 and 221, respectively, and the projecting lug 223ª carried by the pawl 223 and move these pawls from engagement with the ratchet wheel 219, for which condition the roller 217 is free and the record 52ᶜ may be unwound therefrom. A cutting bar 226 is disposed in a position to facilitate the removal of the completed record portion of the strip 52ᶜ from the main portion thereof. After removing the completed record portion of the strip 52ᶜ, the end of the main portion is engaged by the locking bar 217ᵇ and the releasing member 224 is returned to its normal position, indicated in Fig. 36, for which position the pawls 220, 221 and 223 are free to perform their functions.

In a co-pending application Serial No. 573,126, filed by William G. Kirchhoff, there is shown a similar fare recorder mechanism, and it is to be understood that features which constitute the subject-matter of invention of the co-pending application are not a part of the present invention, and are not, therefore, claimed herein. While my invention is shown in the particular embodiments herein described, it is to be understood, however, that many equivalent constructions may be employed without departing from the spirit of my invention.

What I claim is:

1. In combination a register, a recording mechanism for making a record on said strip, said recording mechanism having means for feeding said strip forward, means for engaging and holding stationary said record strip to facilitate the removal of the end thereof, and means for operating said engaging means and for preventing the operation of said feeding means.

2. In combination a record strip, a recorder for making a record on said strip, means for feeding said strip forward out of said recorder, a receptacle for receiving said strip, a door for said receptacle, means controlled by said door for engaging said strips to facilitate separation thereof and to prevent the removal of an excess of said strips.

3. In combination a record strip, a recorder coöperating with said strip, a receptacle for receiving the strip, feeding means to feed the strip from said recorder to said receptacle, and means at the point where said strip enters the receptacle for preventing the removal of an excess of said strip.

4. In combination a casing, a recorder in said casing, a record strip contained within said casing, a receptacle for receiving said record strip after the same is operated upon by said recorder, said recorder having means to feed said strip into said receptacle, said receptacle having a cover for permitting access to said receptacle, and means controlled by said cover for preventing the removal of an excess of said strip.

5. In combination a casing, a recorder in said casing, a record strip contained within said casing, a receptacle for receiving said record strip after the same is operated upon by said recorder, said recorder having means to feed said strip into said receptacle said receptacle having a cover for permitting access to the strip contained therein, means controlled by said cover for preventing the removal of an excess of said strip and means to lock said recorder and said feeding means, said locking means being controlled by said cover.

6. In a fare recorder, the combination of recording mechanism, a record strip, a container for receiving said record strip, means for normally preventing access to the record in said container and mechanism operated by said preventing means when moved to a position to permit access to the record to prevent the removal from the recorder of an excess of the record strip.

7. In a fare recorder, the combination of recording means, a record strip, a container for receiving the strip after it is acted upon by said recording mechanism, means for normally preventing access to the record in said container and a bar actuated by the preventing means when the latter is moved to a position permitting access to the record, operation of said bar serving to engage the record strip and to hold the same stationary to prevent the removal of an excess thereof.

8. In a fare recorder, the combination of recording mechanism, a record strip, a container for receiving the record strip after the same is acted upon by said recording mechanism, means for normally preventing access to the record in said container, and a bar actuated by the preventing means when the latter is moved to a position permitting access to the record, operation of said bar serving to engage the record strip to hold the same stationary and to prevent the removal of an excess thereof from the recorder, said bar when in its engaging position serving to facilitate the severing of a record from the main portion of the strip.

9. In a fare recorder, the combination of fare registering mechanism, register locking mechanism, a resetting member capable of motion in two directions, and means operated by motion of the resetting member in either direction for actuating the locking mechanism.

10. In a fare recorder, the combination of fare registering mechanism, a register resetting shaft adapted by its operation to lock the registering mechanism against actuation, a resetting member capable of motion in two directions, and means actuated by either direction of motion of the resetting member for moving the resetting shaft to effect such locking operation.

11. In a fare recorder, the combination of fare registering mechanism, a register resetting shaft, register locking mechanism actuated by the resetting shaft, a resetting member capable of motion in two directions to rotate said shaft, and means actuated by either direction of motion of the resetting member for operating the locking mechanism.

12. In a fare recorder, the combination of fare registering mechanism, a register resetting shaft, register locking mechanism actuated by the resetting shaft, a resetting member capable of motion in two directions to rotate said shaft, and two devices actuated by the resetting member to rotate the resetting shaft to lock the registering mechanism, one of such devices operative for each direction of motion of the resetting member.

13. In a fare recorder, the combination of fare registering mechanism, a register resetting shaft, register locking mechanism actuated by the resetting shaft, a resetting member capable of motion in two directions to rotate said shaft, a first device actuated by motion of the resetting member in one direction adapted by its operation to rotate the resetting shaft to reset the registering mechanism and lock the register actuating mechanism, and a second device actuated by motion of the resetting member in the other direction adapted to rotate the resetting shaft to lock the register actuating mechanism.

14. In a fare recorder, the combination of recording mechanism, fare registering mechanism, register locking mechanism, a register resetting member capable of motion in two directions and adapted by its actuation to operate the recording mechanism, and means operated by motion of the resetting member in either direction for actuating the locking mechanism.

15. In a fare recorder, the combination of recording mechanism, fare registering mechanism, a register resetting shaft adapted by its operation to lock the registering mechanism against actuation, a resetting member capable of motion in two directions and adapted by its actuation to operate the recording mechanism, and means actuated by either direction of motion of the resetting member for moving the resetting shaft to effect such locking operation.

16. In a fare recorder, the combination of recording mechanism, fare registering mechanism, a register resetting shaft, register locking mechanism actuated by the resetting shaft, a resetting member capable of motion in two directions and adapted by its actuation to operate the recording mechanism, and means actuated by either direction of motion of the resetting member for operating the locking mechanism.

17. In a fare recorder, the combination of recording mechanism, fare registering mechanism, a register resetting shaft, register locking mechanism actuated by the resetting shaft, a resetting member capable of motion in two directions and adapted by its actuation to operate the recording mechanism, and two devices actuated by the resetting member to rotate the resetting shaft to lock the registering mechanism, one of such devices operative for each direction of motion of the resetting member.

18. In a fare recorder, the combination of recording mechanism, fare registering mechanism, a register resetting shaft, register locking mechanism actuated by the resetting shaft, a resetting member capable of motion in two directions and adapted by its actuation to operate the recording mechanism, a first device actuated by motion of the resetting member in one direction adapted by its operation to rotate the resetting shaft to reset the registering mechanism and lock the register actuating mechanism, and a second device actuated by motion of the resetting member in the other direction adapted to rotate the resetting shaft to lock the register actuating mechanism.

19. In a fare recorder, the combination of fare registering mechanism, a register resetting shaft operative in but one direction and adapted by its operation to lock the register actuating mechanism, register locking mechanism actuated by the resetting shaft, a resetting member capable of motion in two directions, a first pawl actuated by motion of the resetting member in one direction to rotate the resetting shaft to reset the registering mechanism and lock the register actuating mechanism, and a second pawl actuated by motion of the resetting member in the other direction adapted to rotate the resetting shaft to lock the register actuating mechanism.

20. In a fare recorder, the combination of recording mechanism, fare registering mechanism, a register resetting shaft operative in but one direction and adapted by its operation to lock the register actuating mechanism, register locking mechanism actuated by the resetting shaft, a resetting member capable of motion in two directions and adapted by its actuation to operate the recording mechanism, a first pawl actuated by motion of the resetting member in one direction to rotate the resetting shaft to reset the registering mechanism and lock the register actuating mechanism, and a second pawl actuated by motion of the resetting member in the other direction adapted to rotate the resetting shaft to lock the register actuating mechanism.

21. In a fare recorder, the combination of registering mechanism, a member capable of motion in two directions, and means operated by motion of such member in either direction for locking the registering mechanism against actuation.

22. In a fare recorder, the combination of registering mechanism, recording mechanism, a member capable of motion in two directions and adapted by its actuation to operate the recording mechanism, and means operated by motion of such member in either direction for locking the registering mechanism against actuation.

23. In a fare recorder, the combination of registering mechanism, recording mechanism, a member capable of motion in two directions, and means operated by motion of such member in either direction for actuating the recording mechanism and locking the registering mechanism against actuation.

24. In a fare recorder, the combination of registering mechanism, a device for locking such mechanism, a member capable of motion in two directions, motion in one direction serving to move the device to its locking position and motion in the other direction serving to move the device to an inoperative position.

25. In a fare recorder, the combination of registering mechanism, a member capable of motion in two directions, a device for locking such mechanism for each direction of motion of such member, motion of such member in one direction serving to move one device to its locking position and motion in the other direction serving to move the other device to its locking position.

26. In a fare recorder, the combination of registering mechanism, a member capable of motion in two directions, a device for locking such mechanism for each direction of motion of such member, motion of such member in one direction serving to move one device to its locking position and motion in the other direction serving to move the other device to its locking position and the first device to an inoperative position.

27. In a fare recorder, the combination of registering mechanism, a member capable of motion in two directions, a device for locking such mechanism for each direction of motion of such member, motion of such member in one direction serving to move one device to its locking position and motion in the other direction serving to move the other device to its locking position and the first device to an inoperative position and subsequent motion of such member in the first direction serving to again bring the first device into operative position.

28. In a fare recorder, the combination of registering mechanism, a member capable of motion in two directions, pawls for locking such mechanism for either direction of motion of such member, motion of such member in a first direction serving to move a first one of such pawls to its locking position and motion in the other direction serving to move the other pawl to its locking position and the first pawl to an inoperative position, subsequent motion of such member in the first direction serving to bring both pawls into normal position to release such mechanism.

29. In a fare recorder, the combination of registering mechanism, a key escutcheon having printing and released positions, and means for retaining the escutcheon in its printing position when the registering mechanism is in its operative condition.

30. In a fare recorder, the combination of registering mechanism, an identification key, and means for retaining the key in its printing position when the registering mechanism is in its operative condition.

31. In a fare recorder, the combination of registering mechanism, a key escutcheon having printing and released positions, resetting mechanism for the registering mechanism, and a lock under the control of the resetting mechanism for preventing motion of the escutcheon to its released position when the registering mechanism is in its operative condition.

32. In a fare recorder, the combination of registering mechanism, a key escutcheon having printing and released positions, means for locking the escutcheon in its printing position when the registering mechanism is in its operative condition, and a member capable of motion in two directions, motion in one direction serving to reset the registering mechanism and motion in the other direction serving to release the locking means.

33. In a fare recorder, the combination of registering mechanism, a key escutcheon having printing and released positions, means for locking the escutcheon in its printing position when the registering mechanism is in its operative condition, recording mechanism, and a member adapted by motion in either of two directions to actuate such recording mechanism, motion in one direction of such member serving to reset the registering mechanism and motion in the other direction serving to release the locking means.

34. In a fare recorder, the combination of registering mechanism, a key escutcheon having printing and released positions, means for locking the escutcheon in its printing position when the registering mechanism is in its operative condition, recording mechanism, and a resetting shaft adapted when not in normal position to lock the registering mechanism against actuation, motion of such shaft in one direction serving to reset the registering mechanism and actuate the recording mechanism and motion of such shaft in the other direction serving to actuate the recording mechanism and release the escutcheon.

35. In a fare recorder, the combination of recording mechanism, a record strip for receiving impressions from the recording mechanism, a cutting bar adapted to grip and hold the strip stationary to facilitate severing a record from the main portion of the strip and means controlled by the recording mechanism for operating said cutting bar.

36. In a fare recorder, the combination of recording mechanism, a plurality of overlapping record strips for receiving impressions from the recording mechanism, cutting bars for severing record portions from the main portions of a part only of said plurality of the strips, one of such bars being adapted to grip and hold the corresponding strip stationary to facilitate the severing operation.

37. In a fare recorder, the combination of recording mechanism, a record strip for receiving impressions from the recording mechanism, a cutting bar for severing a record from the main portion of the strip, and a cover for protecting the completed record, motion of such cover to its open position serving to bring the cutting bar into engagement with the strip to facilitate the severing operation.

38. In a fare recorder, the combination of recording mechanism, record strips for receiving impressions from the recording mechanism, cutting bars for severing record portions from the main portions of the strips, and a cover for protecting the completed records, motion of such cover to its open position serving to bring one of the cutting bars into engagement with the corresponding strip to facilitate the severing operation.

39. In a fare recorder, the combination of recording mechanism, an identification key, record receiving means, a cover for such means, and devices for retaining the cover in position over such means when the key is in printing position.

40. In a fare recorder, the combination of recording mechanism, an identification key, record receiving means, a cover for such means, and devices normally locking the cover in position over such means releasable by movement of the key to its inoperative position.

41. In a fare recorder, the combination of recording mechanism, an identification key, a record strip, a sliding cover for such strip, and a lock for such cover, motion of the key from its operative to its inoperative position serving to release such lock.

42. In an identification fare recorder, the combination of a key escutcheon, a record strip, a cover for such strip, and a lock for the cover, motion of the escutcheon from its operative to its inoperative position serving to release such lock.

43. In combination a supply roll for furnishing a record strip, recording means for making a record on said strip, a cylindrical receiving drum for receiving the strip after a record is made upon the same, said drum having a slot and a substantially tangential guide for feeding the strip into said drum in such position as to permit the natural set of the strip to form the strip into a hollow roll in said drum, and feeding means for advancing the strip from said supply roll through said register means and into said drum, said means comprising a roller of small diameter around which the strip is bent in the direction of its natural set.

44. In a fare recorder, the combination of an identification key, a printing member, and a lock for normally retaining the key in printing position, operation of such printing member serving to release the lock.

45. In a fare recorder, the combination of an escutcheon adapted to receive a printing key, a printing member, and a lock releasable by the printing member for normally retaining the escutcheon in printing position.

46. In a fare recorder, the combination of recording mechanism, an identification key escutcheon, a sliding bar for operating the recording mechanism, and a lock for normally retaining the escutcheon in its printing position, motion of the sliding bar to operate the recorder mechanism serving to release such lock.

47. In a fare recorder, the combination of recording mechanism, an identification key escutcheon, a sliding bar for operating the recording mechanism a lock for normally retaining the escutcheon in its printing position, motion of the sliding bar to operate the recorder mechanism serving to release such lock, and means for moving the escutcheon from its printing position when thus released.

48. In a fare recorder, the combination of registering mechanism, a resetting shaft, a resetting handle normally disconnected from such shaft, and a plug for connecting such shaft and handle.

49. In a fare recorder, the combination of registering mechanism, recording mechanism, a shaft adapted by its operation to reset the registering mechanism and actuate the recording mechanism, an operating handle normally disconnected from such shaft, and a plug for connecting such shaft and handle.

50. In a fare recorder, the combination of recording mechanism, a shaft adapted by its operation to actuate the recording mechanism, an operating handle normally disconnected from such shaft, and a plug for connecting such handle and shaft.

51. In a fare recorder, the combination of a manually operable printing member, resetting mechanism, and reversible devices under the control of the resetting mechanism for determining the direction in which the printing member may be moved.

52. In a fare recorder, the combination of recording mechanism, manually operable mechanism for actuating the recording mechanism, a printing member, and devices under the control of the actuating mechanism for determining the direction in which the printing member may be moved.

53. In a fare recorder, the combination of registering mechanism, resetting mechanism, a printing member, and devices under the control of the resetting mechanism normally permitting motion of the printing member in only a direction to make a record.

54. In a fare recorder, the combination of registering mechanism, resetting mechanism. a printing member, and devices under the control of the resetting mechanism normally permitting motion of the printing member in only a direction to make a record, operation of the resetting mechanism serving to change the relation of such devices so that the printing member may be moved only in a direction to return such member to its normal position.

55. In a fare recorder, the combination of registering mechanism, recording mechanism, a resetting member adapted by its operation to actuate the recording mechanism, a sliding bar adapted to actuate the recording mechanism, and devices normally serving to permit motion of such bar in only a direction to make a record.

56. In a fare recorder, the combination of registering mechanism, recording mechanism, a resetting member adapted by its operation to actuate the recording mechanism. a sliding bar adapted to actuate the recording mechanism, and detent devices normally serving to permit motion of such bar in only a direction to make a record, operation of such member to actuate the recording mechanism serving to reverse the detent devices to permit motion of such bar in only a direction to return it to normal position.

57. In a fare recorder, the combination of recording mechanism, a shaft adapted by its operation to actuate such mechanism, a sliding bar adapted to actuate such mechanism, and detent devices for normally preventing motion of such bar except in a direction to make a record.

58. In a fare recorder, the combination of recording mechanism, a shaft adapted by its operation to actuate such mechanism, a sliding bar adapted to actuate such mechanism, and detent devices for normally preventing motion of such bar except in a direction to make a record, operation of such shaft to make a record reversing the relation of the detent devices to prevent motion of such bar except to return it to normal position.

59. In a fare recorder, the combination of a key escutcheon, a normally disconnected train of actuating mechanism, means for connecting such train as desired, and means controlled by the key escutcheon for preventing withdrawal of the connecting means when the escutcheon is in its printing position.

60. In a fare recorder, the combination of registering mechanism, resetting mechanism, a resetting handle normally disconnected from the resetting mechanism, a key escutcheon, means of connecting the handle and resetting mechanism as desired, and means controlled by the escutcheon for preventing withdrawal of the connecting means when the escutcheon is in its printing position.

61. In a fare recorder, the combination of recording mechanism, recorder actuating mechanism, an operating handle normally disconnected from the actuating mechanism, a key escutcheon having printing and released positions, means insertible for either position of the escutcheon for connecting the actuating mechanism and handle, and means controlled by the escutcheon for permitting withdrawal of the connecting means only when the escutcheon is in its released position.

62. In a fare recorder, the combination of registering mechanism, recording mechanism, a shaft adapted by its operation to reset the registering mechanism and actuate the recording mechanism, an operating handle normally disconnected from such shaft, a key escutcheon having printing and released positions, a plug for connecting such shaft and handle, and a spring actuated latch conformed to permit insertion of the plug for either position of the escutcheon and to permit withdrawal of the plug only when the escutcheon is in its released position.

63. In a fare recorder, the combination of registering mechanism, resetting mechanism, a resetting handle normally disconnected from the resetting mechanism, a printing member, and means for connecting the handle and resetting mechanism, a displaced condition of such member from its normal position serving to prevent motion of the connecting means to or from its operative position.

64. In a fare recorder, the combination of recording mechanism, recorder actuating mechanism, an operating handle normally disconnected from the actuating mechanism, a printing member, and means for connecting the actuating mechanism and handle, the printing member conformed to permit insertion or withdrawal of the connecting means only when in its normal position.

65. In a fare recorder, the combination of registering mechanism, recording mechanism, a shaft adapted by its operation to reset the registering mechanism and actuate the recording mechanism, an operating handle normally disconnected from such shaft, a sliding bar adapted when moved from its normal position to actuate the recording mechanism, and a plug for connecting such shaft and handle, such bar when moved from its normal position adapted to lie in the path of the plug to prevent either its insertion or withdrawal.

66. In a fare recorder, the combination of recording mechanism, an identification key, a spring catch for retaining the key in printing position, and means for locking such catch against operation.

67. In a fare recorder, the combination of recording mechanism, an identification key, a key escutcheon having printing and released positions, locking means adapted to permit insertion of the key into the escutcheon when in the printing position and to retain the key when inserted, and means for preventing motion of the locking means.

68. In a fare recorder, the combination of recording mechanism, an identification key, a key escutcheon having printing and released positions, locking means adapted to permit insertion of the key into the escutcheon when in the printing position and to retain the key when inserted, a printing member, and a stop actuated by the printing member when moved from its normal position to prevent motion of the locking means.

69. In a fare recorder, the combination of recording mechanism, an identification key, a key escutcheon having printing and released positions, a spring pawl adapted to permit insertion of the key into the escutcheon when the latter is in its printing position and to retain the key when inserted, a sliding bar for operating the recording mechanism, and a lock actuated by the sliding bar when moved to its recording position to prevent operation of the pawl.

70. In a fare recorder, the combination of recording mechanism, mechanism adapted to operate the recording mechanism when moved in either of two directions, a record strip, and feeding mechanism for advancing the strip the amount of a single record for each motion in one direction of the operating mechanism and for advancing such strip an amount to move the complete record from the recorder for each motion in the other direction of the operating mechanism.

71. In a fare recorder, the combination of recording mechanism, resetting mechanism operable in two directions, a record strip, feeding devices for the record strip, and gearing between the resetting mechanism and the feeding devices adapted to advance the strip a single record for each operation in one direction of the resetting mechanism and to advance such strip to move the last record outside of the recorder for each operation in the other direction of the resetting mechanism.

72. In a fare recorder, the combination of recording mechanism, a shaft adapted to operate the recording mechanism for motion in either direction, feeding rolls for the record strip, a pawl adapted to advance the rolls a single record for each operation of the shaft in one direction, and gearing adapted to advance the rolls to move the last record from the recorder for each operation of the shaft in the other direction.

73. In a fare recorder, the combination of recording mechanism, mechanism adapted to operate the recording mechanism when moved in either of two directions, and a record strip, motion of the operating mechanism in one direction serving to advance the strip a single record and motion in the other direction serving to move a complete record from the recorder.

74. In a fare recorder, the combination of fare registering mechanism, register locking mechanism, a resetting member capable of motion in two directions, means operated by motion of the resetting member in either direction for actuating the locking mechanism, a key escutcheon having printing and released positions, and means for retaining the escutcheon in its printing position when the registering mechanism is in its operative condition.

75. In a fare recorder, the combination of recording mechanism, fare registering mechanism, a register resetting shaft operative in but one direction and adapted by its operation to lock the register actuating mechanism, register locking mechanism actuated by the resetting shaft, a resetting member capable of motion in two directions and adapted by its actuation to operate the recording mechanism, a first pawl actuated by motion of the resetting member in one direction to rotate the resetting shaft to reset the registering mechanism and lock the register actuating mechanism, a second pawl actuated by motion of the resetting member in the other direction adapted to rotate the resetting shaft to lock the register actuating mechanism, a key escutcheon having printing and released positions, and means for locking the escutcheon in its printing position when the registering mechanism is in its operative condition, operation of the resetting member in the other direction serving to release the escutcheon locking means.

76. In a fare recorder, the combination of fare registering mechanism, register locking mechanism, a resetting member capable of motion in two directions, means operated by motion of the resetting member in either direction for actuating the locking mechanism, a key escutcheon having printing and released positions, means for retaining the escutcheon in its printing position when the registering mechanism is in its operative condition, a resetting handle normally disconnected from the resetting member, and means for connecting the handle and resetting member as desired.

77. In a fare recorder, the combination of fare registering mechanism, a register resetting shaft operative in but one direction and adapted by its operation to lock the register actuating mechanism, register locking mechanism actuated by the resetting shaft, a resetting member capable of motion in two directions, a first pawl actuated by motion of the resetting member in one direction to rotate the resetting shaft to reset the registering mechanism and lock the register actuating mechanism, a second pawl actuated by motion of the resetting member in the other direction adapted to rotate the resetting shaft to lock the register actuating mechanism, a key escutcheon having printing and released positions, means for locking the escutcheon in its printing position when the registering mechanism is in its operative condition, recording mechanism, motion of the resetting member in either direction serving to actuate such recording mechanism and motion of such member in a direction to actuate the second pawl serving to release the locking means, an operating handle normally disconnected from the resetting shaft, and a plug for connecting such handle and shaft.

78. In a fare recorder, the combination of fare registering mechanism, register locking mechanism, a resetting member capable of motion in two directions, means operated by motion of the resetting member in either direction for actuating the locking mechanism, a key escutcheon having printing and released positions, means for retaining the escutcheon in its printing position when the registering mechanism is in its operative condition, a resetting handle normally disconnected from the resetting member, means for connecting the handle and resetting member as desired, and means controlled by the escutcheon for preventing withdrawal of the connecting means when the escutcheon is in its printing position.

79. In a fare recorder, the combination of recording mechanism, fare registering mechanism, a register resetting shaft operative in but one direction and adapted by its operation to lock the register actuating mechanism, register locking mechanism actuated by the resetting shaft, a resetting member capable of motion in two directions and adapted by its actuation to operate the recording mechanism, a first pawl actuated by motion of the resetting member in one direction to rotate the resetting shaft to reset the registering mechanism and lock the register actuating mechanism, a second pawl actuated by motion of the resetting member in the other direction adapted to rotate the resetting shaft to lock the register actuating mechanism, a key escutcheon having printing and released positions, means for locking the escutcheon in its printing position when the registering mechanism is in its operative condition, operation of the resetting member in the other direction serving to release the escutcheon locking means, an operating handle normally disconnected from such shaft, a plug for connecting such shaft and handle, and a spring actuated latch conformed to permit insertion of the plug for either position of the escutcheon and to permit withdrawal of the plug only when the escutcheon is in its released position.

80. In a fare recorder, the combination of fare registering mechanism, register locking mechanism, a resetting member capable of motion in two directions, means operated by motion of the resetting member in either direction for actuating the locking mechanism, a key escutcheon having printing and released positions, means for retaining the escutcheon in its printing position when the registering mechanism is in its operative condition, a resetting handle normally disconnected from the resetting member, means for connecting the handle and resetting member as desired, means controlled by the escutcheon for preventing withdrawal of the connecting means when the escutcheon is in its printing position, and a printing member, a displaced condition of such printing member from its normal position serving to prevent motion of the connecting means to or from its operative position.

81. In a fare recorder, the combination of fare registering mechanism, a register resetting shaft operative in but one direction and adapted by its operation to lock the register actuating mechanism, register locking mechanism actuated by the resetting shaft, a resetting member capable of motion in two directions, a first pawl actuated by motion of the resetting member in one direction to rotate the resetting shaft to reset the registering mechanism and lock the register actuating mechanism, a second pawl actuated by motion of the resetting member in the other direction adapted to rotate the resetting shaft to lock the register actuating mechanism, a key escutcheon having printing and released positions, means for locking the escutcheon in its printing position when the registering mechanism is in its operative condition, recording mechanism, motion of such member in a direction to operate the second pawl serving to release the locking means, an operating handle normally disconnected from such shaft, a plug for connecting such shaft and handle, a spring actuated latch conformed to permit insertion of the plug for either position of the escutcheon and to permit withdrawal of the plug only when the escutcheon is in its released position, and a sliding bar adapted when moved from its normal position to actuate the recording mechanism, such bar when moved from its normal position adapted to lie in the path of the plug to prevent either its insertion or withdrawal.

82. In a fare recorder, the combination of fare registering mechanism, register locking mechanism, a resetting member capable of motion in two directions, means operated by motion of the resetting member in either direction for actuating the locking mechanism, a resetting handle normally disconnected from the resetting member, and means for connecting the handle and resetting member as desired.

83. In a fare recorder, the combination of recording mechanism, fare registering mechanism, a register resetting shaft operative in but one direction and adapted by its operation to lock the register actuating mechanism, register locking mechanism actuated by the resetting shaft, a resetting member capable of motion in two directions and adapted by its actuation to operate the recording mechanism, a first pawl actuated by motion of the resetting member in one direction to rotate the resetting shaft to reset the registering mechanism and lock the register actuating mechanism, a second pawl actuated by motion of the resetting member in the other direction adapted to rotate the resetting shaft to lock the register actuating mechanism, an operating handle normally disconnected from such shaft, and a plug for connecting such handle and shaft.

84. In a fare recorder, the combination of fare registering mechanism, register locking mechanism, a resetting member capable of motion in two directions, means operated by motion of the resetting member in either direction for actuating the locking mechanism, a resetting handle normally disconnected from the resetting member, a key escutcheon, means for connecting the handle and resetting member as desired, and means controlled by the escutcheon for preventing withdrawal of the connecting means when the escutcheon is in its printing position.

85. In a fare recorder, the combination of recording mechanism, fare registering mechanism, a register resetting shaft operative in but one direction and adapted by its operation to lock the register actuating mechanism, register locking mechanism actuated by the resetting shaft, a resetting member capable of motion in two directions and adapted by its actuation to operate the recording mechanism, a first pawl actuated by motion of the resetting member in one direction to rotate the resetting shaft to reset the registering mechanism and lock the register actuating mechanism, a second pawl actuated by motion of the resetting member in the other direction adapted to rotate the resetting shaft to lock the register actuating mechanism, an operating handle normally disconnected from such shaft, a key escutcheon having printing and released positions, a plug for connecting such shaft and handle, and a spring actuated latch conformed to permit insertion of the plug for either position of the escutcheon and to permit withdrawal of the plug only when the escutcheon is in its released position.

86. In a fare recorder, the combination of fare registering mechanism, register locking mechanism, a resetting member capable of motion in two directions, means operated by motion of the resetting member in either direction for actuating the locking mechanism, a resetting handle normally disconnected from the resetting member, a key escutcheon, means for connecting the handle and resetting member as desired, means controlled by the escutcheon for preventing withdrawal of the connecting means when the escutcheon is in its printing position, and a printing member, a displaced condition of such printing member from its normal position serving to prevent motion of the connecting means from its operative position.

87. In a fare recorder, the combination of fare registering mechanism, a register resetting shaft operative in but one direction and adapted by its operation to lock the register actuating mechanism, register locking mechanism actuated by the resetting shaft, a resetting member capable of motion in two directions, a first pawl actuated by motion of the resetting member in one direction to rotate the resetting shaft to reset the registering mechanism and lock the register actuating mechanism, a second pawl actuated by motion of the resetting member in the other direction adapted to rotate the resetting shaft to lock the register actuating mechanism, an operating handle normally disconnected from such shaft, recording mechanism, a key escutcheon having printing and released positions, a plug for connecting such shaft and handle, a spring actuated latch conformed to permit insertion of the plug for either position of the escutcheon and to permit withdrawal of the plug only when the escutcheon is in its released position, and a sliding bar adapted when moved from its normal position to actuate the recording mechanism, such bar when thus moved adapted to lie in the path of the plug to prevent either its insertion or withdrawal.

88. In a fare recorder, the combination of fare registering mechanism, register locking mechanism, a resetting member capable of motion in two directions, means operated by motion of the resetting member in either direction for actuating the locking mechanism, a resetting handle normally disconnected from the resetting member, means for connecting the handle and resetting member as desired, and a printing member, a displaced condition of such printing member from its normal position serving to prevent motion of the connecting means to or from its operative position.

89. In a fare recorder, the combination of recording mechanism, fare registering mechanism, a register resetting shaft operative in but one direction and adapted by its operation to lock the register actuating mechanism, register locking mechanism actuated by the resetting shaft, a resetting member capable of motion in two directions and adapted by its actuation to operate the recording mechanism, a first pawl actuated by motion of the resetting member in one direction to rotate the resetting shaft to reset the registering mechanism and lock the register actuating mechanism, a second pawl actuated by motion of the resetting member in the other direction adapted to rotate the resetting shaft to lock the register actuating mechanism, an operating handle normally disconnected from such shaft, a plug for connecting such handle and shaft, and a sliding bar adapted when moved from its normal position to actuate the recording mechanism, such bar when thus moved adapted to lie in the path of the plug to prevent either its insertion or withdrawal.

90. In a fare recorder, the combination of fare registering mechanism, register locking mechanism, a resetting member capable of motion in two directions, means operated by motion of the resetting member in either direction for actuating the locking mechanism, a printing member, and reversible devices under the control of the resetting member for determining the direction of motion of the printing member.

91. In a fare recorder, the combination of recording mechanism, fare registering mechanism, a register resetting shaft operative in but one direction and adapted by its operation to lock the register actuating mechanism, register locking mechanism actuated by the resetting shaft, a resetting member capable of motion in two directions and adapted by its actuation to operate the recording mechanism, a first pawl actuated by motion of the resetting member in one direction to rotate the resetting shaft to reset the registering mechanism and lock the register actuating mechanism, a second pawl actuated by motion of the resetting member in the other direction adapted to rotate the resetting shaft to lock the register actuating mechanism, a sliding bar adapted to actuate the recording mechanism, and detent devices normally serving to permit motion of such bar in only a direction to make a record, operation of such shaft to actuate the recording mechanism serving to reverse the detent devices to permit motion of such bar in only a direction to return it to normal position.

92. In a fare recorder, the combination of fare registering mechanism, register locking mechanism, a resetting member capable of motion in two directions, means operated by motion of the resetting member in either direction for actuating the locking mechanism, a key escutcheon having printing and released positions, means for retaining the escutcheon in its printing position when the registering mechanism is in its operative condition, a printing member, and reversible devices under the control of the resetting member for determining the direction of motion of the printing member.

93. In a fare recorder, the combination of recording mechanism, fare registering mechanism, a register resetting shaft operative in but one direction and adapted by its operation to lock the register actuating mechanism, register locking mechanism actuated by the resetting shaft, a resetting member capable of motion in two directions and adapted by its actuation to operate the recording mechanism, a first pawl actuated by motion of the resetting member in one direction to rotate the resetting shaft to reset the registering mechanism and lock the register actuating mechanism, a second pawl actuated by motion of the resetting member in the other direction adapted to rotate the resetting shaft to lock the register actuating mechanism, a key escutcheon having printing and released positions, means for locking the escutcheon in its printing position when the registering mechanism is in its operative condition, operation of the resetting member in the other direction serving to release the escutcheon locking means, a sliding bar adapted to actuate the recording mechanism, and detent devices normally serving to permit motion of such bar in only a direction to make a record, operation of such shaft to actuate the recording mechanism serving to reverse the detent devices to permit motion of such bar in only a direction to return it to normal position.

94. In a fare recorder, the combination of fare registering mechanism, register locking mechanism, a resetting member capable of motion in two directions, means operated by motion of the resetting member in either direction for actuating the locking mechanism, a resetting handle normally disconnected from the resetting member, a key escutcheon, means for connecting the handle and resetting member as desired, means controlled by the escutcheon for preventing withdrawal of the connecting means when the escutcheon is in its printing position, a printing member, and reversible devices under the control of the resetting member for determining the direction of motion of the printing member.

95. In a fare recorder, the combination of recording mechanism, fare registering mechanism, a register resetting shaft operative in but one direction and adapted by its operation to lock the register actuating mechanism, register locking mechanism actuated by the resetting shaft, a resetting member capable of motion in two directions and adapted by its actuation to operate the recording mechanism, a first pawl actuated by motion of the resetting member in one direction to rotate the resetting shaft to reset the registering mechanism and lock the register actuating mechanism, a second pawl actuated by motion of the resetting member in the other direction adapted to rotate the resetting shaft to lock the register actuating mechanism, an operating handle normally disconnected from such shaft, a key escutcheon having printing and released positions, a plug for connecting such shaft and handle, a spring actuated latch conformed to permit insertion of the plug for either position of the escutcheon and to permit withdrawal of the plug only when the escutcheon is in its released position, a sliding bar adapted to actuate the recording mechanism, and detent devices normally serving to permit motion of such bar in only a direction to make a record, operation of such shaft to actuate the recording mechanism serving to reverse the detent devices to permit motion of such bar in only a direction to return it to normal position.

96. In a fare recorder, the combination of registering mechanism, a key escutcheon having printing and released positions, means for retaining the escutcheon in its printing position when the registering mechanism is in its operative condition, an identification key, record receiving means, a cover for such means, and devices for retaining the cover in position over such means when the key is in printing position.

97. In a fare recorder, the combination of registering mechanism, a key escutcheon having printing and released positions, means for locking the escutcheon in its printing position when the registering mechanism is in its operative condition, recording mechanism, a resetting member adapted when not in normal position to lock the registering mechanism against actuation, motion of such member in one direction serving to reset the registering mechanism and actuate the recording mechanism and motion of such member in the other direction serving to actuate the recording mechanism and release the escutcheon, a record strip, a cover for such strip, and a lock for the cover, motion of the escutcheon from its operative to its inoperative position serving to release such lock.

98. In a fare recorder, the combination of registering mechanism, a key escutcheon having printing and released positions, means for retaining the escutcheon in its printing position when the registering mechanism is in its operative condition, an identification key, record receiving means, a cover for such means, devices for retaining the cover in position over such means when the key is in printing position, a record strip for receiving impressions from the recording mechanism, and a cutting bar for severing a record from the main portion of the strip.

99. In a fare recorder, the combination of registering mechanism, a key escutcheon having printing and released positions, means for locking the escutcheon in its printing position when the registering mechanism is in its operative condition, recording mechanism, a resetting member adapted when not in normal position to lock the registering mechanism against actuation, motion of such member in one direction serving to reset the registering mechanism and actuate the recording mechanism and motion of such member in the other direction serving to actuate the recording mechanism and release the escutcheon, record strips, a cover for such strips, a lock for the cover, motion of the escutcheon from its operative to its inoperative position serving to release such lock, and cutting bars for severing record portions from the main portions of the strips, one of such bars adapted to grip the corresponding strip to facilitate the severing operation.

100. In a fare recorder, the combination of registering mechanism, a key escutcheon having printing and released positions, means for retaining the escutcheon in its printing position when the registering mechanism is in its operative condition, an identification key, record receiving means, a cover for such means, devices for retaining the cover in position over such means when the key is in printing position, a record strip for receiving impressions for the recording mechanism, a cutting bar for severing a record from the main portion of the strip, a printing member, and a lock releasable by the printing member for normally retaining the escutcheon in printing position.

101. In a fare recorder, the combination of registering mechanism, a key escutcheon having printing and released positions, means for locking the escutcheon in its printing position when the registering mechanism is in its operative condition, recording mechanism, a resetting member adapted when not in normal position to lock the registering mechanism against actuation, motion of such member in one direction serving to reset the registering mechanism and actuate the recording mechanism and motion of such member in the other direction serving to actuate the recording mechanism and release the escutcheon, record strips, a cover for such strips, a lock for the cover, motion of the escutcheon from its operative to its inoperative position serving to release such lock, cutting bars for severing record portions from the main portions of the strips, one of such bars adapted to grip the corresponding strip to facilitate the severing operation, a sliding bar for operating the recording mechanism, a lock for normally retaining the escutcheon in its printing position, motion of the sliding bar to operate the recorder mechanism serving to release such lock, and means for moving the escutcheon from its printing position when thus released.

102. In a fare recorder, the combination of registering mechanism, a key escutcheon having printing and released positions, means for retaining the escutcheon in its printing position when the registering mechanism is in its operative condition, an identification key, record receiving means, a cover for such means, devices for retaining the cover in position over such means when the key is in printing position, a record strip for receiving impressions from the recording mechanism, a cutting bar for severing a record from the main portion of the strip, resetting mechanism, a resetting handle normally disconnected from the resetting mechanism, means for connecting the handle and resetting mechanism as desired, and means controlled by the escutcheon for preventing withdrawal of the connecting means when the escutcheon is in its printing position.

103. In a fare recorder, the combination of registering mechanism, a key escutcheon having printing and released positions, means for locking the escutcheon in its printing position when the registering mechanism is in its operative condition, recording mechanism, a resetting member adapted when not in normal position to lock the registering mechanism against actuation, motion of such member in one direction serving to reset the registering mechanism and actuate the recording mechanism and motion of such member in the other direction serving to actuate the recording mechanism and release the escutcheon, record strips, a cover for such strips, a lock for the cover, motion of the escutcheon from its operative to its inoperative position serving to release such lock, cutting bars for severing record portions from the main portions of the strips, one of such bars adapted to grip the corresponding strip to facilitate the severing operation, an operating handle normally disconnected from such member, a plug for connecting such member and handle, and a spring actuated latch conformed to permit insertion of the plug for either position of the escutcheon and to permit withdrawal of the plug only when the escutcheon is in its released position.

104. In a fare recorder, the combination of registering mechanism, a key escutcheon having printing and released positions, means for retaining the escutcheon in its printing position when the registering mechanism is in its operative condition, a printing member, and a lock releasable by the printing member for normally retaining the escutcheon in printing position.

105. In a fare recorder, the combination of registering mechanism, a key escutcheon having printing and released positions, means for locking the escutcheon in its printing position when the registering mechanism is in its operative condition, recording mechanism, a resetting member adapted when not in normal position to lock the registering mechanism against actuation, motion of such member in one direction serving to reset the registering mechanism and actuate the recording mechanism and motion of such member in the other direction serving to actuate the recording mechanism and release the escutcheon, a sliding bar for operating the recording mechanism, a lock for normally retaining the escutcheon in its printing position, motion of the sliding bar to operate the recorder mechanism serving to release such lock, and means for moving the escutcheon from its printing position when thus released.

106. In a fare recorder, the combination of registering mechanism, a key escutcheon having printing and released positions, means for retaining the escutcheon in its printing position when the registering mechanism is in its operative condition, a printing member, a lock releasable by the printing member for normally retaining the escutcheon in printing position, resetting mechanism, a resetting handle normally disconnected from the resetting mechanism, means for connecting the handle and resetting mechanism as desired, and means controlled by the escutcheon for preventing withdrawal of the connecting means when the escutcheon is in its printing position.

107. In a fare recorder, the combination of registering mechanism, a key escutcheon having printing and released positions, means for locking the escutcheon in its printing position when the registering mechanism is in its operative condition, recording mechanism, a resetting member adapted when not in normal position to lock the registering mechanism against actuation, motion of such member in one direction serving to reset the registering mechanism and actuate the recording mechanism and motion of such member in the other direction serving to actuate the recording mechanism and release the escutcheon, a sliding bar for operating the recording mechanism, a lock for normally retaining the escutcheon in its printing position, motion of the sliding bar to operate the recorder mechanism serving to release such lock, means for moving the escutcheon from its printing position when thus released, an operating handle normally disconnected from such member, a plug for connecting such member and handle, and a spring actuated latch conformed to permit insertion of the plug for either position of the escutcheon and to permit withdrawal of the plug only when the escutcheon is in its released position.

108. In a fare recorder, the combination of registering mechanism, a key escutcheon having printing and released positions, means for retaining the escutcheon in its printing position when the registering mechanism is in its operative condition, a printing member, a lock releasable by the printing member for normally retaining the escutcheon in printing position, resetting mechanism, a resetting handle normally disconnected from the resetting mechanism, means for connecting the handle and resetting mechanism as desired, means controlled by the escutcheon for preventing withdrawal of the connecting means when the escutcheon is in its printing position, a displaced condition of the printing member from its normal position serving to prevent motion of the connecting means from its operative position.

109. In a fare recorder, the combination of registering mechanism, a key escutcheon having printing and released positions, means for locking the escutcheon in its printing position when the registering mechanism is in its operative condition, recording mechanism, a resetting member adapted when not in normal position to lock the registering mechanism against actuation, motion of such member in one direction serving to reset the registering mechanism and actuate the recording mechanism and motion of such member in the other direction serving to actuate the recording mechanism and release the escutcheon, a sliding bar for operating the recording mechanism, a lock for normally retaining the escutcheon in its printing position, motion of the sliding bar to operate the recorder mechanism serving to release such lock, means for moving the escutcheon from its printing position when thus released, an operating handle normally disconnected from such shaft, a plug for connecting such shaft and handle, a spring actuated latch conformed to permit insertion of the plug for either position of the escutcheon and to permit withdrawal of the plug only when the escutcheon is in its released position, such sliding bar when moved from its normal position adapted to lie in the path of the plug to prevent either its insertion or withdrawal.

110. In a fare recorder, the combination of registering mechanism, a key escutcheon having printing and released positions, means for retaining the escutcheon in its printing position when the registering mechanism is in its operative condition, a printing member, a lock releasable by the printing member for normally retaining the escutcheon in printing position, a spring catch for retaining the key in printing position, and means for locking such catch against operation.

111. In a fare recorder, the combination of registering mechanism, a key escutcheon having printing and released positions, means for locking the escutcheon in its printing position when the registering mechanism is in its operative condition, recording mechanism, a resetting member adapted when not in normal position to lock the registering mechanism against actuation, motion of such member in one direction serving to reset the registering mechanism and actuate the recording mechanism and motion of such member in the other direction serving to actuate the recording mechanism and release the escutcheon, a sliding bar for operating the recording mechanism, a lock for normally retaining the escutcheon in its printing position, motion of the sliding bar to operate the recorder mechanism serving to release such lock, means for moving the escutcheon from its printing position when thus released, an identification key, a spring pawl adapted to permit insertion of the key into the escutcheon when the latter is in its printing position and to retain the key when inserted, and a lock actuated by the sliding bar when moved to its recording position to prevent operation of the pawl.

112. In a fare recorder, the combination of registering mechanism, a key escutcheon having printing and released positions, means for retaining the escutcheon in its printing position when the registering mechanism is in its operative condition, a printing member, a lock releasable by the printing member for normally retaining the escutcheon in printing position, resetting mechanism, a resetting handle normally disconnected from the resetting mechanism, means for connecting the handle and resetting mechanism as desired, means controlled by the escutcheon for preventing withdrawal of the connecting means when the escutcheon is in its printing position, a spring catch for retaining the key in printing position, and means for locking such catch against operation.

113. In a fare recorder, the combination of registering mechanism, a key escutcheon having printing and released positions, means for locking the escutcheon in its printing position when the registering mechanism is in its operative condition, recording mechanism, a resetting member adapted when not in normal position to lock the registering mechanism against actuation, motion of such member in one direction serving to reset the registering mechanism and actuate the recording mechanism and motion of such member in the other direction serving to actuate the recording mechanism and release the escutcheon, a sliding bar for operating the recording mechanism, a lock for normally retaining the escutcheon in its printing position, motion of the sliding bar to operate the recorder mechanism serving to release such lock, means for moving the escutcheon from its printing position when thus released, an operating handle normally disconnected from such member, a plug for connecting such member and handle, a spring actuated latch conformed to permit insertion of the plug for either position of the escutcheon and to permit withdrawal of the plug only when the escutcheon is in its released position, an identification key, a spring pawl adapted to permit insertion of the key into the escutcheon when the latter is in its printing position and to retain the key when inserted, and a lock actuated by the sliding bar when moved to its recording position to prevent operation of the pawl.

114. In a fare recorder, the combination of registering mechanism, a key escutcheon having printing and released positions, means for retaining the escutcheon in its printing position when the registering mechanism is in its operative condition, resetting mechanism, a resetting handle normally disconnected from the resetting mechanism, and means for connecting the handle and resetting mechanism as desired.

115. In a fare recorder, the combination of registering mechanism, a key escutcheon having printing and released positions, means for locking the escutcheon in its printing position when the registering mechanism is in its operative condition, recording mechanism, a resetting member adapted when not in normal position to lock the registering mechanism against actuation, motion of such member in one direction serving to reset the registering mechanism and actuate the recording mechanism and motion of such member in the other direction serving to actuate the recording mechanism and release the escutcheon, an operating handle normally disconnected from such member, and a plug for connecting such handle and member.

116. In a fare recorder, the combination of registering mechanism, a key escutcheon having printing and released positions, means for retaining the escutcheon in its printing position when the registering mechanism is in its operative condition, resetting mechanism, a resetting handle normally disconnected from the resetting mechanism, means for connecting the handle and resetting mechanism as desired, and means controlled by the escutcheon for preventing withdrawal of the connecting means when the escutcheon is in its printing position.

117. In a fare recorder, the combination of registering mechanism, a key escutcheon having printing and released positions, means for locking the escutcheon in its printing position when the registering mechanism is in its operative condition, recording mechanism, a resetting member adapted when not in normal position to lock the registering mechanism against actuation, motion of such member in one direction serving to reset the registering mechanism and actuate the recording mechanism and motion of such member in the other direction serving to actuate the recording mechanism and release the escutcheon, an operating handle normally disconnected from such member, a plug for connecting such member and handle, and a spring actuated latch conformed to permit insertion of the plug for either position of the escutcheon and to permit withdrawal of the plug only when the escutcheon is in its released position.

118. In a fare recorder, the combination of registering mechanism, a key escutcheon having printing and released positions, means for retaining the escutcheon in its printing position when the registering mechanism is in its operative condition, resetting mechanism, a resetting handle normally disconnected from the resetting mechanism, means for connecting the handle and resetting mechanism as desired, means controlled by the escutcheon for preventing withdrawal of the connecting means when the escutcheon is in its printing position, and a printing member, a displaced condition of such member from its normal position serving to prevent motion of the connecting means from its operative position.

119. In a fare recorder, the combination of registering mechanism, a key escutcheon having printing and released positions, means for locking the escutcheon in its printing position when the registering mechanism is in its operative condition, recording mechanism, a resetting member adapted when not in normal position to lock the registering mechanism against actuation, motion of such member in one direction serving to reset the registering mechanism and actuate the recording mechanism and motion of such member in the other direction serving to actuate the recording mechanism and release the escutcheon, an operating handle normally disconnected from such member, a plug for connecting such member and handle, a spring actuated latch conformed to permit insertion of the plug for either position of the escutcheon and to permit withdrawal of the plug only when the escutcheon is in its released position, and a sliding bar adapted when moved from its normal position to actuate the recording mechanism, such bar when thus moved adapted to lie in the path of the plug to prevent either its insertion or withdrawal.

120. In a fare recorder, the combination of recording mechanism, a record strip for receiving impressions from the recording mechanism, a cutting bar for severing a record from the main portion of the strip, an identification key, record receiving means, a cover for such means, and devices for retaining the cover in position over such means when the key is in printing position.

121. In a fare recorder, the combination of recording mechanism, record strips for receiving impressions from the recording mechanism, cutting bars for severing record portions from the main portions of the strips, one of such bars adapted to grip the corresponding strip to facilitate the severing operation, a cover for such record strips, and a lock for the cover, motion of the escutcheon from its operative to its inoperative position serving to release such lock.

122. In a fare recorder, the combination of recording mechanism, a record strip for receiving impressions from the recording mechanism, a cutting bar for severing a record from the main portion of the strip, an identification key, record receiving means, a cover for such means, devices for retaining the cover in position over such means when the key is in printing position, a supply roll, and a receptacle for receiving the completed record.

123. In a fare recorder, the combination of recording mechanism, record strips for receiving impressions from the recording mechanism, cutting bars for severing record portions from the main portions of the strips, one of such bars adapted to grip the corresponding strip to facilitate the severing operation, a cover for such record strips, a lock for the cover, motion of the escutcheon from its operative to its inoperative position serving to release such lock, a supply roll, and a cylindrical receptacle for receiving within it the completed records in the form of a hollow roll.

124. In a fare recorder, the combination of recording mechanism, a record strip for receiving impressions from the recording mechanism, a cutting bar for severing a record from the main portion of the strip, an identification key, record receiving means, a cover for such means, devices for retaining the cover in position over such means when the key is in printing position, a supply roll, and a receptacle for receiving the completed record in the direction of the natural set of the strip.

125. In a fare recorder, the combination of recording mechanism, record strips for receiving impressions from the recording mechanism, cutting bars for severing record portions from the main portions of the strips, one of such bars adapted to grip the corresponding strip to facilitate the severing operation, a cover for such record strips, a lock for the cover, motion of the escutcheon from its operative to its inoperative position serving to release such lock, a supply roll, and a cylindrical receptacle for receiving within it the completed records in the form of a hollow roll in the direction of the natural set of the strips.

126. In a fare recorder, the combination of registering mechanism, resetting mechanism, a resetting handle normally disconnected from the resetting mechanism, means for connecting the handle and resetting mechanism as desired, a printing member, and reversible devices under the control of the resetting mechanism for determining the direction of motion of the printing member.

127. In a fare recorder, the combination of recording mechanism, a shaft adapted by its operation to actuate the recording mechanism, an operating handle normally disconnected from such shaft, a plug for connecting such handle and shaft, a sliding bar adapted to actuate the recording mechanism, and detent devices normally serving to permit motion of such bar in only a direction to make a record, operation of such a shaft to actuate the recording mechanism serving to reverse the detent devices to permit motion of such bar in only a direction to return it to normal position.

128. In a fare recorder, the combination of registering mechanism, resetting mechanism, a resetting handle normally disconnected from the resetting mechanism, a key escutcheon, means for connecting the handle and resetting mechanism as desired, means controlled by the escutcheon for preventing withdrawal of the connecting means when the escutcheon is in its printing position, a printing member, and reversible devices under the control of the resetting mechanism for determining the direction of motion of the printing member.

129. In a fare recorder, the combination of registering mechanism, recording mechanism, a shaft adapted by its operation to reset the registering mechanism and actuate the recording mechanism, an operating handle normally disconnected from such shaft, a key escutcheon having printing and released positions, a plug for connecting such shaft and handle, a spring actuated latch conformed to permit insertion of the plug for either position of the escutcheon and to permit withdrawal of the plug only when the escutcheon is in its released position, a sliding bar adapted to actuate the recording mechanism, and detent devices normally serving to permit motion of such bar in only a direction to make a record, operation of such shaft to actuate the recording mechanism serving to reverse the detent devices to permit motion of such bar in only a direction to return it to normal position.

130. In a fare recorder, the combination of registering mechanism, resetting mechanism, a resetting handle normally disconnected from the resetting mechanism, a key escutcheon, means for connecting the handle and resetting mechanism as desired, means controlled by the escutcheon for preventing withdrawal of the connecting means when the escutcheon is in its printing position, and a printing member, a displaced condition of such member from its normal position serving to prevent motion of the connecting means to or from its operative position.

131. In a fare recorder, the combination of registering mechanism, recording mechanism, a shaft adapted by its operation to reset the registering mechanism and actuate the recording mechanism, an operating handle normally disconnected from such shaft, a key escutcheon having printing and released positions, a plug for connecting such shaft and handle, a spring actuated latch conformed to permit insertion of the plug for either position of the escutcheon and to permit withdrawal of the plug only when the escutcheon is in its released position, and a sliding bar adapted when moved from its normal position to actuate the recording mechanism, such bar when moved from its normal position adapted to lie in the path of the plug to prevent either its insertion or withdrawal.

132. In a fare recorder, the combination of registering mechanism, resetting mechanism, a resetting handle normally disconnected from the resetting mechanism, a key escutcheon, means for connecting the handle and resetting mechanism as desired, means controlled by the escutcheon for preventing withdrawal of the connecting means when the escutcheon is in its printing position, a printing member, a displaced condition of such member from its normal position serving to prevent motion of the connecting means to or from its operative position, and reversible devices under the control of the resetting member for determining the direction of motion of the printing member.

133. In a fare recorder, the combination of registering mechanism, recording mechanism, a shaft adapted by its operation to reset the registering mechanism and actuate the recording mechanism, an operating handle normally disconnected from such shaft, a key escutcheon having printing and released positions, a plug for connecting such shaft and handle, a spring actuated latch conformed to permit insertion of the plug for either position of the escutcheon and to permit withdrawal of the plug only when the escutcheon is in its released position, a sliding bar adapted when moved from its normal position to actuate the recording mechanism, such bar when moved from its normal position adapted to lie in the path of the plug to prevent either its insertion or withdrawal, and detent devices normally serving to permit motion of such bar in only a direction to make a record, operation of such shaft to actuate the recording mechanism serving to reverse the detent devices to permit motion of such bar in only a direction to return it to normal position.

134. In a fare recorder, the combination of an escutcheon adapted to receive a printing key, a printing member, and a lock releasable by the printing member for normally retaining the escutcheon in printing position, a displaced condition of such member from its normal position serving to prevent motion of the connecting means to or from its operative position.

135. In a fare recorder, the combination of recording mechanism, an identification key escutcheon, a sliding bar for operating the recording mechanism, a lock for normally retaining the escutcheon in its printing position, motion of the sliding bar to operate the recorder mechanism serving to release such lock, means for moving the escutcheon from its printing position when thus released, registering mechanism, a shaft adapted by its operation to reset the registering mechanism and actuate the recording mechanism, an operating handle normally disconnected from such shaft, and a plug for connecting such shaft and handle, such sliding bar when moved from its normal position adapted to lie in the path of the plug to prevent either its insertion or withdrawal.

136. In a fare recorder, the combination of an escutcheon adapted to receive a printing key, a printing member, a lock releasable by the printing member for normally retaining the escutcheon in printing position, registering mechanism, resetting mechanism, a resetting handle normally disconnected from the resetting mechanism, means for connecting the handle and resetting mechanism, a displaced condition of such member from its normal position serving to prevent motion of the connecting means to or from its operative position, a spring catch for retaining the key in printing position, and means for locking such catch against operation.

137. In a fare recorder, the combination of recording mechanism, an identification key escutcheon, a sliding bar for operating the recording mechanism, a lock for normally retaining the escutcheon in its printing position, motion of the sliding bar to operate the recorder mechanism serving to release such lock, means for moving the escutcheon from its printing position when thus released, registering mechanism, a shaft adapted by its operation to reset the registering mechanism and actuate the recording mechanism, an operating handle normally disconnected from such shaft, a plug for connecting such shaft and handle, such sliding bar when moved from its normal position adapted to lie in the path of the plug to prevent either its insertion or withdrawal, an identification key, a spring pawl adapted to permit insertion of the key into the escutcheon when the latter is in its printing position and to retain the key when inserted, and a lock actuated by the sliding bar when moved to its recording position to prevent operation of the pawl.

138. In a fare recorder, the combination of registering mechanism, resetting mechanism, a resetting handle normally disconnected from the resetting mechanism, a printing member, means for connecting the handle and resetting mechanism, a displaced condition of such member from its normal position serving to prevent motion of the connecting means to or from its operative position, an identification key having printing and released positions, a spring catch for retaining the key in printing position, and means for locking such catch against operation.

139. In a fare recorder, the combination of registering mechanism, recording mechanism, a shaft adapted by its operation to reset the registering mechanism and actuate the recording mechanism, an operating handle normally disconnected from such shaft, a sliding bar adapted when moved from its normal position to actuate the recording mechanism, a plug for connecting such shaft and handle, such bar when moved from its normal position adapted to lie in the path of the plug to prevent either its insertion or withdrawal, an identification key, a key escutcheon having printing and released positions, a spring pawl adapted to permit insertion of the key into the escutcheon when the latter is in its printing position and to retain the key when inserted, and a lock actuated by the sliding bar when moved to its recording position to prevent operation of the pawl.

140. In a fare recorder, the combination of a key escutcheon having printing and released positions, an identification key, means for preventing displacement of the escutcheon to its released position when the key is not in such escutcheon, registering mechanism, and means for retaining the escutcheon in its printing position when the registering mechanism is in its operative condition.

141. In a fare recorder, the combination of a key escutcheon having printing and released positions, an identification key, a spring tumbler for engaging the escutcheon to prevent displacement to its released position when the key is not in the escutcheon, the end of the key so conformed as to engage and support the tumbler out of the path of the escutcheon when the key is in the escutcheon, registering mechanism, means for locking the escutcheon in its printing position when the registering mechanism is in its operative condition, recording mechanism, and a member adapted by motion in either of two directions to actuate such recording mechanism, motion in one direction of such member serving to reset the registering mechanism and motion in the other direction serving to release the locking means.

142. In a fare recorder, the combination of a key escutcheon having printing and released positions, an identification key, means for preventing displacement of the escutcheon to its released position when the key is not in such escutcheon, registering mechanism, means for retaining the escutcheon in its printing position when the registering mechanism is in its operative condition, a printing member, and a lock releasable by the printing member for normally retaining the escutcheon in printing position.

143. In a fare recorder, the combination of a key escutcheon having printing and released positions, an identification key, a spring tumbler for engaging the escutcheon to prevent its displacement to its released position when the key is not in the escutcheon, the end of the key so conformed as to engage and support the tumbler out of the path of the escutcheon when the key is in the escutcheon, registering mechanism, means for locking the escutcheon in its printing position when the registering mechanism is in its operative condition, recording mechanism, a member adapted by motion in either of two directions to actuate such recording mechanism, motion in one direction of such member serving to reset the registering mechanism and motion in the other direction serving to release the locking means, a sliding bar for operating the recording mechanism, a lock for normally retaining the escutcheon in its printing position, motion of the sliding bar to operate the recorder mechanism serving to release such lock, and means for moving the escutcheon from its printing position when thus released.

144. In a fare recorder, the combination of recording mechanism comprising a plurality of independent printing devices, independent actuating mechanisms for such devices, an escutcheon adapted to receive a printing key, and a lock releasable by one of such actuating mechanisms for normally retaining the escutcheon in printing position.

145. In a fare recorder, the combination of registering mechanism, means for recording the readings of the registering mechanism, means for recording the identification of the conductor operating the recorder, a register resetting member adapted when rotated in either direction to actuate the register recording means, a sliding bar independently operable for actuating the identification recording means, an identification key escutcheon, a lock for normally retaining the escutcheon in its printing position, motion of the sliding bar to operate the recorder mechanism serving to release such lock, and means for moving the escutcheon from its printing position when thus released.

146. In a fare recorder, the combination of recording mechanism comprising a plurality of independent printing devices, independent actuating mechanisms for such devices, resetting mechanism, and reversible devices under the control of the resetting mechanism for determining the direction of motion of one of such actuating mechanisms.

147. In a fare recorder, the combination of registering mechanism, means for recording the readings of the registering mechanism, means for recording the identification of the conductor operating the recorder, a register resetting member adapted when rotated in either direction to actuate the register recording means, a sliding bar independently operable for actuating the identification recording means, and ratchet devices normally serving to permit motion of such bar in only a direction to make a record, operation of such member to actuate the recording mechanism serving to reverse the ratchet devices to permit motion of such bar in only a direction to return it to normal position.

148. In a fare recorder, the combination of recording mechanism comprising a plurality of independent printing devices, independent actuating mechanisms for such devices, registering mechanism, resetting mechanism, a resetting handle normally disconnected from the resetting mechanism, and means for connecting the handle and resetting mechanism, a displaced condition of one of such actuating mechanisms from its normal position serving to prevent motion of the connecting means to or from its operative position.

149. In a fare recorder, the combination of registering mechanism, means for recording the readings of the registering mechanism, means for recording the identification of the conductor operating the recorder, a register resetting member adapted when rotated in either direction to actuate the register recording means, a sliding bar independently operable for actuating the identification recording means, an operating handle normally disconnected from such member, and a plug for connecting such member and handle, such bar when moved from its normal position adapted to lie in the path of the plug to prevent either its insertion or withdrawal.

150. In a fare recorder, the combination of recording mechanism comprising a plurality of independent printing devices, independent actuating mechanisms for such devices, an identification key, a spring catch for retaining the key in printing position, and means for locking such catch against operation.

151. In a fare recorder, the combination of registering mechanism, means for recording the readings of the registering mechanism, means for recording the identification of the conductor operating the recorder, a register resetting member adapted when rotated in either direction to actuate the register recording means, a sliding bar independently operable for actuating the identification recording means, an identification key, a key escutcheon having printing and released positions, a spring pawl adapted to permit insertion of the key into the escutcheon when the latter is in its printing position and to retain the key when inserted, and a lock actuated by the sliding bar when moved to its recording position to prevent operation of the pawl.

152. In a fare recorder, the combination of resetting mechanism capable of motion in two directions and normally operable in one direction only, a printing member adapted by its operation to permit motion of the resetting mechanism in the other direction, an escutcheon adapted to receive a printing key, and a lock releasable by the printing member for normally retaining the escutcheon in printing position.

153. In a fare recorder, the combination of registering mechanism, means for recording the readings of the registering mechanism, a register resetting member adapted to operate the register recording means when actuated in either direction, devices for normally permitting motion of such member in a first direction only, an identification key escutcheon having printing and released positions, a lock for maintaining the escutcheon in its printing position for motion of the resetting shaft in such first direction, a sliding bar for making a record of the identification key, such bar when in its operated position serving to move such devices to permit motion of the resetting member only in a second direction to release such lock, a second lock for normally retaining the escutcheon in its printing position, motion of the sliding bar to operate the recorder mechanism serving to release such second lock, and means for moving the escutcheon from its printing position when released.

154. In a fare recorder, the combination of resetting mechanism capable of motion in two directions and normally operable in one direction only, a printing member adapted by its operation to permit motion of the resetting mechanism in the other direction, and reversible devices under the control of the resetting mechanism for determining the direction of motion of the printing member.

155. In a fare recorder, the combination of registering mechanism, means for recording the readings of the registering mechanism, a register resetting member adapted to operate the register recording means when actuated in either direction, devices for normally permitting motion of such member in a first direction only, an identification key escutcheon having printing and released positions, a lock for maintaining the escutcheon in its printing position for motion of the resetting member in such first direction, a sliding bar for making a record of the identification key, such bar when in its operated position serving to move such devices to permit motion of the resetting member only in a second direction to release such lock, and detent devices normally serving to permit motion of such bar in only a direction to make a record, operation of such member to actuate the recording mechanism serving to reverse the detent devices to permit motion of such bar in only a direction to return it to normal position.

156. In a fare recorder, the combination of resetting mechanism capable of motion in two directions and normally operable in one direction only, a printing member adapted by its operation to permit motion of the resetting mechanism in the other direction, a resetting handle normally disconnected from the resetting mechanism, and means for connecting the handle and resetting mechanism, a displaced condition of such member from its normal position serving to prevent motion of the connecting means to or from its operative position.

157. In a fare recorder, the combination of registering mechanism, means for recording the readings of the registering mechanism, a register resetting member adapted to operate the register recording means when actuated in either direction, devices for normally permitting motion of such member in a first direction only, an identification key escutcheon having printing and released positions, a lock for maintaining the escutcheon in its printing position for motion of the resetting member in such first direction, a sliding bar for making a record of the identification key, such bar when in its operated position serving to move such devices to permit motion of the resetting member only in a second direction to release such lock, an operating handle normally disconnected from such member, and a plug for connecting such member and handle, such bar when moved from its normal position adapted to lie in the path of the plug to prevent either its insertion or withdrawal.

158. In a fare recorder, the combination of resetting mechanism capable of motion in two directions and normally operable in one direction only, a printing member adapted by its operation to permit motion of the resetting mechanism in the other direction, an identification key, a spring catch for retaining the key in printing position, and means for locking such catch against operation.

159. In a fare recorder, the combination of registering mechanism, means for recording the readings of the registering mechanism, a register resetting member adapted to operate the register recording means when actuated in either direction, devices for normally permitting motion of such member in a first direction only, an identification key escutcheon having printing and released positions, a lock for maintaining the escutcheon in its printing position for motion of the resetting member in such first direction, a sliding bar for making a record of the identification key, such bar when in its operated position serving to move such devices to permit motion of the resetting member only in a second direction to release such lock, a spring pawl adapted to permit insertion of a key into the escutcheon when the latter is in its printing position and to retain the key when inserted, and a lock actuated by the sliding bar when moved to its recording position to prevent operation of the pawl.

160. In a fare recorder, the combination of a resetting member, two pawls adapted to alternately engage such member to determine its direction of motion, a printing member adapted by its position to determine the pawl that is in operative position, an escutcheon adapted to receive a printing key, and a lock releasable by the printing member for normally retaining the escutcheon in printing position.

161. In a fare recorder, the combination of registering mechanism, means for recording the readings of the registering mechanism, a register resetting member adapted to operate the register recording means when actuated in either direction, a first pawl for permitting rotation of such member in only a first direction, a second pawl for permitting rotation of such member only in a second direction, an identification key escutcheon having printing and released positions, a lock for maintaining the escutcheon in its printing position for rotation of such member in the first direction, a sliding bar for making a record of the identification key, such bar when in its operated position serving to remove the first pawl and to bring into operative position the second pawl to permit motion of such member in a direction to release such lock, motion of such bar to its normal position serving to remove the second pawl and again bring into operative position the first pawl, a lock for normally retaining the escutcheon in its printing position, motion of the sliding bar to its operated position serving to release such lock, and means for moving the escutcheon from its printing position when thus released.

162. In a fare recorder, the combination of a resetting member, two pawls adapted to alternately engage such member to determine its direction of motion, a printing member adapted by its position to determine the pawl that is in operative position, and reversible devices under the control of the resetting member for determining the direction of motion of the printing member.

163. In a fare recorder, the combination of registering mechanism, means for recording the readings of the registering mechanism, a register resetting member adapted to operate the register recording means when actuated in either direction, a first pawl for permitting rotation of such member in only a first direction, a second pawl for permitting rotation of such member only in a second direction, an identification key escutcheon having printing and released positions, a lock for maintaining the escutcheon in its printing position for rotation of such member in the first direction, a sliding bar for making a record of the identification key, such bar when in its operated position serving to remove the first pawl and to bring into operative position the second pawl to permit motion of such member in a direction to release such lock, motion of such bar to its normal position serving to remove the second pawl and again bring into operative position the first pawl, and detent devices normally serving to permit motion of such bar in only a direction to make a record, operation of such member to actuate the recording mechanism serving to reverse the detent devices to permit motion of such bar in only a direction to return it to normal position.

164. In a fare recorder, the combination of a resetting member, two pawls adapted to alternately engage such member to determine its direction of motion, a printing member adapted by its position to determine the pawl that is in operative position, a resetting handle normally disconnected from the resetting member, and means for connecting the handle and resetting member, a displaced condition of such printing member from its normal position serving to prevent motion of the connecting means to or from its operative position.

165. In a fare recorder, the combination of registering mechanism, means for recording the readings of the registering mechanism, a register resetting member adapted to operate the register recording means when actuated in either direction, a first pawl for permitting rotation of such member in only a first direction, a second pawl for permitting rotation of such member only in a second direction, an identification key escutcheon having printing and released positions, a lock for maintaining the escutcheon in its printing position for rotation of such member in the first direction, a sliding bar for making a record of the identification key, such bar when in its operated position serving to remove the first pawl and to bring into operative position the second pawl to permit motion of such member in a direction to release such lock, motion of such bar to its normal position serving to remove the second pawl and again bring into operative position the first pawl, an operating handle normally disconnected from such member, and a plug for connecting such member and handle, such bar when moved from its normal position adapted to lie in the path of the plug to prevent either its insertion or withdrawal.

166. In a fare recorder, the combination of a resetting member, two pawls adapted to alternately engage such member to determine its direction of motion, a printing member adapted by its position to determine the pawl that is in operative position, an identification key, a spring catch for retaining the key in printing position, and means for locking such catch against operation.

167. In a fare recorder, the combination of registering mechanism, means for recording the readings of the registering mechanism, a register resetting member adapted to operate the register recording means when actuated in either direction, a first pawl for permitting rotation of such member in only a first direction, a second pawl for permitting rotation of such member only in a second direction, an identification key escutcheon having printing and released positions, a lock for maintaining the escutcheon in its printing position for rotation of such member in the first direction, a sliding bar for making a record of the identification key, such bar when in its operated position serving to remove the first pawl and to bring into operative position the second pawl to permit motion of such member in a direction to release such lock, motion of such bar to its normal position serving to remove the second pawl and again bring into operative position the first pawl, a spring pawl adapted to permit insertion of a key into the escutcheon when the latter is in its printing position and to retain the key when inserted, and a lock actuated by the sliding bar when moved to its recording position to prevent operation of the pawl.

168. In combination a two-part frame, said frame parts being pivoted together at one end, a supply roll on one part of the frame near the edge adjacent the other part, a feeding roller near the lower end of the other frame part, an impression making device for making a legible record on said strip mounted on one of said frame parts and lying next to one side of said strip, a coöperating impression-making device mounted on the other frame part and lying next to the opposite side of said strip, said strip being set between said impression-making devices substantially on the dividing line between the two parts whereby separation of the two parts exposes both sides of the record strip simultaneously.

169. In a fare recorder, a frame comprising two parts pivoted together, a recorder mounted on one side of said frame, a record supplying roll for supplying a record supplying roll to said recorder, said record strip being mounted on one part of said frame, means mounted on another part of said frame from said recorder and adapted to coöperate with said recorder for making a record on said strip, said strip passing between said recorder and said means, and means mounted on the other part of the frame from that part on which the supply roll is mounted for receiving said record strip after a record has been made on the same.

170. In combination a two-part frame, said parts being pivoted together at one end, a record roll mounted near said pivot on one part of the frame, a recording device on one of said parts adapted to make a record on said strip, a coöperating recording device on the other part of the frame, said recording devices being adapted to engage the record strip between them, a roller mounted on the opposite part of the frame from said record roll, and means to cause said roll to feed the record between said recording devices.

171. In combination a two-part frame, said parts being pivoted together at one end, a record roll bearing a record strip mounted on one part of said frame, a recording device mounted on one of said frame parts, actuating devices mounted on said one part, a striker mounted on the other of said parts, said record strip being adapted to be fed between said recording device and said striker, and separable connections between said actuating device and said striker.

172. In a fare register, a pivoted separable two-part frame, a supply roll for supplying a record strip, a movable striking platen on one of said parts, character wheels on said other part, releasable means normally holding said frame-parts together and a separable actuating connection for operating said striking platen.

173. In a fare register, a pivoted two-part frame, recording devices carried by each of said parts, a record strip located between said devices and rendered accessible on both sides by separation of said parts, and means for normally holding said parts together.

174. In a fare register, a separable two-part frame, a record strip, recording devices carried by each of said parts, separable actuating connections between said devices, a record strip located between said devices and having both sides simultaneously rendered accessible by separation of said parts, and means for normally holding said frame-parts together.

175. In a fare recorder, a separable two-part frame, recording mechanism mounted on both parts of said frame, and a record strip in said frame, one end of the record strip being held on one frame part and the other end of the record strip being held on the other frame part, said frame-parts being separable to expose simultaneously both sides of said record strip.

176. In a fare recorder, recording mechanism, a record strip for receiving impressions from the recording mechanism, a cutting bar adapted to grip and hold stationary the record strip to facilitate severing thereof, and independently operable means for operating said cutting bar, said independent means being controlled by said recording means.

177. In a fare register, recording mechanism, a plurality of record strips for receiving impressions from the recording mechanism, cutting bars for severing record portions from the main portions of the strips, one of said bars being adapted to grip the corresponding strip to facilitate the severing operations, and independently operable means controlled by the recording mechanism for operating the cutting bar.

In witness whereof, I hereunto subscribe my name this 6th day of September, A. D. 1910.

ARTHUR H. WOODWARD.

Witnesses:
ALBERT C. BELL,
ROBERT F. BRACKE.